US011226625B2

(12) United States Patent
Herz et al.

(10) Patent No.: US 11,226,625 B2
(45) Date of Patent: Jan. 18, 2022

(54) GUIDANCE OF AUTONOMOUS VEHICLES IN DESTINATION VICINITIES USING INTENT SIGNALS

(71) Applicant: Apple Inc., Cupertino, CA (US)

(72) Inventors: Scott M. Herz, San Jose, CA (US); Sawyer I. Cohen, Menlo Park, CA (US); Samuel B. Gooch, San Francisco, CA (US); Wolf Kienzle, Sunnyvale, CA (US); Karlin Y. Bark, Menlo Park, CA (US); Jack J. Wanderman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 16/530,796

(22) Filed: Aug. 2, 2019

(65) Prior Publication Data

US 2020/0026288 A1 Jan. 23, 2020

Related U.S. Application Data

(63) Continuation of application No. 15/826,486, filed on Nov. 29, 2017, now Pat. No. 10,372,132.

(Continued)

(51) Int. Cl.
*G05D 1/00* (2006.01)
*G01C 21/36* (2006.01)
(Continued)

(52) U.S. Cl.
CPC .......... *G05D 1/0088* (2013.01); *B60W 30/06* (2013.01); *B60W 50/10* (2013.01); *B62D 15/027* (2013.01);
(Continued)

(58) Field of Classification Search
USPC ........................................................ 701/23
See application file for complete search history.

(56) References Cited

U.S. PATENT DOCUMENTS 6,240,303 B1 5/2001 Katzur
6,411,926 B1 6/2002 Chang
(Continued)

FOREIGN PATENT DOCUMENTS

CN 102306051 A 1/2012
CN 103921788 7/2014
(Continued)

OTHER PUBLICATIONS

Andrew Wilson, et al., "XWand: UI for Intelligent Spaces," In Proceedings of the SIGCHI conference on Human factors in computing systems (pp. 545-552). ACM.
(Continued)

*Primary Examiner* — Tyler D Paige
(74) *Attorney, Agent, or Firm* — Robert C. Kowert; Kowert, Hood, Munyon, Rankin & Goetzel, P.C.

(57) ABSTRACT

Signals usable to determine a path of a vehicle towards a particular stopping point in a vicinity of a destination are detected from an individual authorized to provide guidance with respect to movements of the vehicle. Based at least in part on the signals and a data set pertaining to the external environment of the vehicle, one or more vehicular movements to be implemented to proceed along the path are identified. A directive is transmitted to a motion control subsystem of the vehicle to initiate one of the vehicular movements.

20 Claims, 12 Drawing Sheets

Related U.S. Application Data

(60) Provisional application No. 62/433,224, filed on Dec. 12, 2016.

(51) Int. Cl.
| | |
|---|---|
| *B60W 30/06* | (2006.01) |
| *B62D 15/02* | (2006.01) |
| *G05D 1/02* | (2020.01) |
| *B60W 50/10* | (2012.01) |
| *B60W 50/14* | (2020.01) |

(52) U.S. Cl.
CPC ....... *B62D 15/0285* (2013.01); *G01C 21/362* (2013.01); *G01C 21/3664* (2013.01); *G01C 21/3685* (2013.01); *G05D 1/0212* (2013.01); *G05D 1/0276* (2013.01); *B60W 2050/146* (2013.01); *B60W 2540/215* (2020.02); *B60W 2554/00* (2020.02); *B60W 2556/50* (2020.02); *G05D 2201/0213* (2013.01)

(56) References Cited

U.S. PATENT DOCUMENTS

| | | | |
|---|---|---|---|
| 6,804,396 | B2 | 10/2004 | Higaki et al. |
| 7,000,200 | B1 | 2/2006 | Martins |
| 7,274,800 | B2 | 9/2007 | Nefian et al. |
| 7,394,346 | B2 | 7/2008 | Bodin |
| 7,672,845 | B2 | 3/2010 | Beranek et al. |
| 8,346,426 | B1 | 1/2013 | Szybalski et al. |
| 9,639,994 | B2 | 5/2017 | Beaurepaire |
| 9,682,707 | B1 | 6/2017 | Silver et al. |
| 9,950,711 | B2 | 4/2018 | Kleen et al. |
| 10,372,132 | B2 * | 8/2019 | Herz ............... G05D 1/0276 |
| 2013/0030811 | A1 | 1/2013 | Olleon et al. |
| 2013/0138591 | A1 | 5/2013 | Ricci |
| 2013/0231824 | A1 | 9/2013 | Wilson et al. |
| 2013/0307771 | A1 | 11/2013 | Parker et al. |
| 2014/0074338 | A1 | 3/2014 | Nordbruch et al. |
| 2014/0145934 | A1 | 5/2014 | Hayashida |
| 2014/0223384 | A1 | 8/2014 | Graumann |
| 2014/0237366 | A1 | 8/2014 | Poulos et al. |
| 2014/0361973 | A1 | 12/2014 | Raux et al. |
| 2014/0365228 | A1 | 12/2014 | Ng-Thow-Hing et al. |
| 2015/0100179 | A1 | 4/2015 | Alaniz et al. |
| 2016/0096270 | A1 | 4/2016 | Ibarz Gabardos et al. |
| 2016/0125736 | A1 | 5/2016 | Shaik |
| 2016/0167648 | A1 | 6/2016 | James et al. |
| 2016/0209845 | A1 * | 7/2016 | Kojo ............... G05D 1/0088 |
| 2016/0313737 | A1 | 10/2016 | Berkemeier |
| 2016/0364985 | A1 * | 12/2016 | Penna ............. G08G 1/0967 |
| 2017/0052666 | A1 | 2/2017 | Wang et al. |
| 2017/0144654 | A1 * | 5/2017 | Sham ............. G05D 1/0088 |
| 2017/0147078 | A1 | 5/2017 | van Laack et al. |
| 2017/0206464 | A1 | 7/2017 | Clayton et al. |
| 2017/0212511 | A1 | 7/2017 | Paiva Ferreira et al. |
| 2017/0300803 | A1 * | 10/2017 | Beavers ............ H04W 4/021 |
| 2017/0329346 | A1 * | 11/2017 | Latotzki ........... G05D 1/0088 |
| 2018/0029591 | A1 * | 2/2018 | Lavoie ............. G06N 7/005 |
| 2018/0052458 | A1 | 2/2018 | Tsuji et al. |
| 2018/0074497 | A1 | 3/2018 | Tsuji et al. |
| 2018/0137373 | A1 | 5/2018 | Rasmusson, Jr. et al. |
| 2018/0164817 | A1 * | 6/2018 | Herz ............... G05D 1/0212 |
| 2018/0196428 | A1 | 7/2018 | Pilutti et al. |
| 2018/0237027 | A1 | 8/2018 | Lundsgaard |
| 2018/0283896 | A1 | 10/2018 | Piemonte et al. |
| 2018/0345994 | A1 | 12/2018 | Goerick |
| 2018/0357900 | A1 * | 12/2018 | Wang ............... G06Q 20/127 |

FOREIGN PATENT DOCUMENTS

| | | |
|---|---|---|
| CN | 104321718 A | 1/2015 |
| CN | 104428627 A | 3/2015 |
| CN | 104768130 A | 7/2015 |
| CN | 105377612 A | 3/2016 |
| CN | 105835877 | 8/2016 |
| CN | 106103232 | 11/2016 |
| DE | 10045616 | 3/2002 |
| DE | 102012007984 | 3/2013 |
| EP | 2985571 A2 | 2/2016 |
| EP | 3007036 | 4/2016 |
| KR | 101281499 | 7/2013 |
| WO | 20150106867 | 7/2015 |
| WO | 2015198769 | 12/2015 |
| WO | 2016011353 | 1/2016 |

OTHER PUBLICATIONS

Linda E. Sibert, et al., "Evaluation of Eye Gaze Interaction," Proceedings of the SIGCHI conference on Human Factors in Computing Systems, pp. 281-288 Apr. 1, 2000, ACM.

David Droeschel, et al., "Learning to Interpret Pointing Gestures with a Time-of-Flight Camera," 2011 6th ACM/IEEE International Conference on Human-Robot Interaction (HRI), pp. 481-488.

Yang-Lei Zhao, et al., "Pointing at Responsive Objects Outdoors," In Proceedings of the 2012 ACM international conference on Intelligent User Interfaces (pp. 281-284). ACM.

Andy Lucking, et al. "Pointing andreferencereconsidered," ScienceDirect, Journal of Pragmatics 77 (2015) pp. 56-79.

Takehiko Ohno, et al., "Gaze-Based Interaction for Anyone, Anytime," In Proceedings of HCI International 2003 (vol. 4, pp. 1452-1456).

Richard A. Bolt, ""Put-That-There": Voice and Gesture at the Graphics Interface," 1980 ACM, (vol. 14, No. 3, pp. 262-270). ACM.

Boris Schauerte, et al. ""Look at this!" Learning to Guide Visual Saliency in Human-Robot Interaction," In Intelligent Robots and Systems (IROS 2014), 2014 IEEE/RSJ International Conference on (pp. 995-1002). IEEE.

Rümelin, S., Marouane, C., & Butz, A. (Oct. 2013). Free-hand pointing for identification and interaction with distant objects. In Proceedings of the 5th International Conference on Automotive User Interfaces and Interactive Vehicular Applications (pp. 40-47). ACM.

Nickel, K., & Stiefelhagen, R. (Nov. 2003). Pointing gesture recognition based on 3D-tracking of face, hands and head orientation. In Proceedings of the 5th international conference on Multimodal interfaces (pp. 140-146). ACM.

U.S. Appl. No. 15/676,921, filed Aug. 14, 2017, Kienzle, et al.
U.S. Appl. No. 15/709,389, filed Sep. 19, 2017, Herz, et al.
International Search Report and Written Opinion from PCT/US2017/063932, dated Feb. 12, 2018 Apple Inc., pp. 1-15.

Udara E. Manawadu et al "A hand gesture based driver-vehicle interface to control lateral and longitudinal motions of an autonomous vehicle", 2016 IEEE International Conference on Systems, Man, and Cybernetics (SMC), dated Oct. 9, 2016, pp. 1785-1790.

Office Action and Search Report from Chinese Application No. 201780073523.0, dated Jan. 28, 2021m pp. 1-16.

Office Action dated Aug. 10, 2021 in Chinese Patent Application No. 201780073523.0, Apple Inc. (pp. 1-13 including partial translation).

\* cited by examiner

GUIDANCE OF AUTONOMOUS VEHICLES IN DESTINATION VICINITIES USING INTENT SIGNALS

This application is a continuation of U.S. patent application Ser. No. 15/826,486, filed Nov. 29, 2017, which claims priority to U.S. Provisional Patent Application No. 62/433,224 filed Dec. 12, 2016, titled "Guidance of Autonomous Vehicles in Destination Vicinities Using Intent Signals", which are herein incorporated by reference in their entirety.

BACKGROUND

Technical Field

This disclosure relates generally to systems and algorithms for using various types of signals from occupants for controlling the motion of autonomous or partially autonomous vehicles.

Description of the Related Art

Motorized vehicles which are capable of sensing their environment and navigating to destinations with little or no ongoing input from occupants, and may therefore be referred to as "autonomous" or "self-driving" vehicles, are an increasing focus of research and development. Given the multiplicity of choices that are typically available with respect to vehicle trajectories in real-world environments, occupant input or guidance with regard to selecting vehicle trajectories (without requiring traditional steering, braking, accelerating and the like) may be extremely valuable to the motion control components of such vehicles. However, providing interfaces for such guidance which are intuitive and easy to use, especially within environments such as parking lots for which detailed and/or accurate mapping data may not be available, may present a non-trivial challenge.

SUMMARY OF EMBODIMENTS

Various embodiments of methods and apparatus for guidance of autonomous or semi-autonomous vehicles in destination vicinities using intent signals are described. In at least some embodiments, a method may comprise obtaining, at a navigation manager implemented using one or more computing devices, an indication of a destination of a vehicle (such as a large retail store, an office complex, a shopping mall or the like), where the vicinity of the destination comprises numerous vehicle stopping points (such as parking spaces). A route towards the destination may be identified, and the vicinity of the destination may be reached. At this point, finer-grained guidance regarding the actual stopping point of the vehicle may be needed. The method may further comprise detecting, using one or more sensors, one or more signals generated by an individual authorized or permitted to provide guidance with respect to movements of the vehicle. In embodiments in which the vehicle comprises the equivalent of a conventional steering wheel, the authorized individual is assumed to be one who is not currently steering the vehicle using the steering wheel. The signals may be usable to determine a path, corresponding to an intent or goal of the individual, towards a particular vehicle stopping point in the vicinity of the destination. At least some of the signals may be obtained via a sensor that is mechanically decoupled from steering subsystems of the vehicle—so, for example, if the vehicle comprises a steering wheel or an analogous steering component, such signals may be detected using sensor devices which are not physically attached to or part of the steering wheel or steering component.

Any of a variety of signal modalities and/or interfaces may be used singly or in combination to discover the intent of the authorized individual in various embodiments. For example, in some cases, the individual may gesture towards an intended parking space in a parking area, and combine the gesture with the voice command "Park over there". In another embodiment, the individual may use a touch-sensitive interface, such as a screen of a mobile phone or tablet device, to mark an intended stopping point, trace a path towards a particular area or stopping point, or indicate an intended direction of motion via a virtual joy-stick interface. In some embodiments, the signals may comprise a voice command indicating a landmark or sign which may be visible from the vehicle, such as the equivalent of "Park near the gardening supplies entrance" or "Park near the cafeteria entrance". Based at least in part on the detected signals and at least in part on a data set indicative of the external environment of the vehicle (such as data collected via one or more externally-oriented cameras of the vehicle), one or more vehicular movements which would enable progress to be made along a path towards an intended stopping point may be determined by the navigation manager. The method may further comprise transmitting a first directive to one or more motion control subsystems of the vehicle (such as an acceleration subsystem, a braking subsystem, a steering/turning subsystem and so on) to initiate at least a first vehicular movement of the one or more vehicular movements.

In some embodiments, the signals detected from the individual, which may be termed intent signals herein, may indicate a task or activity that the individual wishes to perform. For example, if the individual states "I'd like to buy some plants for my garden" in the vicinity of a large retail store, the navigation manager may determine that the vehicle should preferably be parked near an entrance marked "gardening" or "gardening supplies". In one embodiment, corresponding to one or more destinations, respective elements of a multi-option menu may be populated with several tasks or activities which can be mapped by the navigation manager to respective sets of stopping points. Such a multi-option menu may be provided to the individual, for example, via a drop-down menu of a text-based interface which can be used by the individual to provide conversational-level guidance to the navigation manager. In one example implementation, using a first level of a two-level text-based guidance procedure, the individual may first indicate the equivalent of "Let's go to the large retail store <LRS>", and then using the second level, the individual may select from among the options "Park near the <main entrance>", "Park near the <gardening entrance>", "Park near the <appliance pickup entrance>", etc., depending on the information available to the navigation manager regarding the individual's likely stopping point preferences with respect to the store. The information about possible classes of stopping points may be obtained in some embodiments from a mapping application or based on an analysis of the vicinity using externally-oriented cameras or other sensors. In various embodiments, in response to detecting that the vicinity of the destination has been reached, the navigation manager may request input from the authorized individual, e.g., by causing a voice signal similar to "We are nearing the store. Shall I park near the main entrance?" to be generated. Default criteria may be used to select a stopping point if the individual fails to provide timely input in some embodiments.

According to one embodiment, a system may comprise one or more sensor devices and a navigation manager associated with a vehicle. The navigation manager may detect, using the one or more sensor devices, one or more signals generated by an individual permitted to provide guidance with respect to movements of the vehicle. The signals may be usable to determine a path towards a particular vehicle stopping point of a plurality of vehicle stopping points in a vicinity of a destination. Based on an analysis of the signals and data pertaining to the external environment of the vehicle, one or more vehicular movements which would enable the vehicle to move along a path towards the stopping point may be identified. The navigation manager may transmit one or more motion directives to a motion control subsystem of the vehicle to initiate at least one of the vehicular movements.

According to some embodiments, a non-transitory computer-accessible storage medium may store program instructions that when executed on one or more processors detect, using one or more sensor devices, one or more signals generated by an individual permitted to provide guidance with respect to movements of a vehicle. The signals may be usable to determine a path towards a particular vehicle stopping point of a plurality of vehicle stopping points in a vicinity of a destination. Based on an analysis of the signals and data pertaining to the external environment of the vehicle, one or more vehicular movements which would enable the vehicle to move along a path towards the stopping point may be identified. A motion directive may be transmitted to a motion control subsystem of the vehicle to initiate at least one of the vehicular movements.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
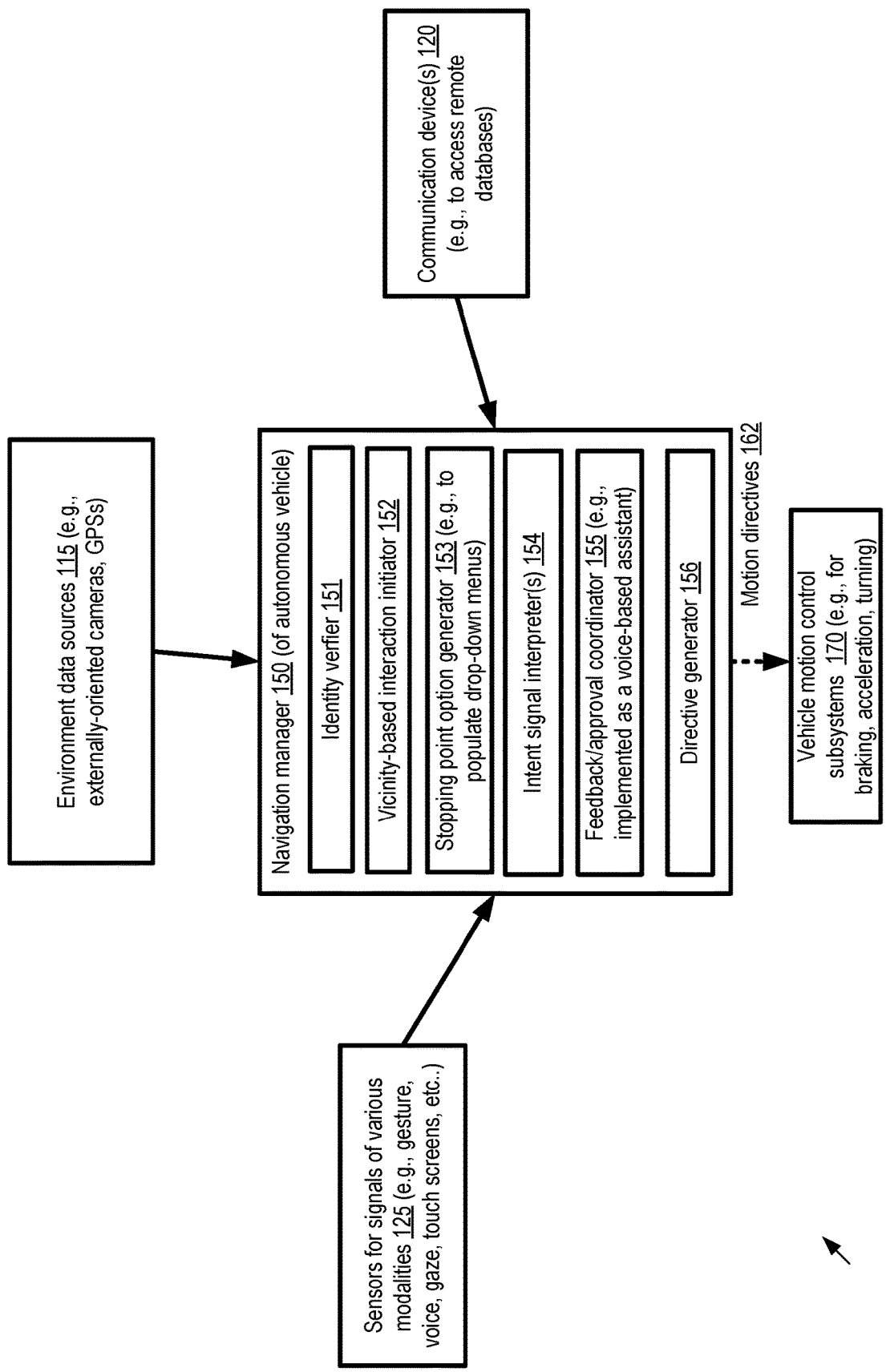
FIG. 1 illustrates an example system environment in which movements of an autonomous vehicle in the vicinity of a destination may be guided at least partly by intent signals provided by an occupant of the vehicle, according to at least some embodiments.

FIG. 1 illustrates an example system environment in which movements of an autonomous vehicle in the vicinity of a destination may be guided at least partly by intent signals provided by an occupant of the vehicle, according to at least some embodiments. As shown, system 100 comprises a navigation manager 150 of an autonomous vehicle, sensors 125 for detecting signals of various modalities (such as gestures, voiced commands, etc.) generated by individuals such as occupants of the vehicle, data sources 115 providing information regarding the external environment of the vehicle, one or more communication devices 120, and various motion control subsystems 170 of the vehicle (such as subsystems for braking, turning or accelerating the vehicle). The navigation manager may comprise part or all of one or more computing devices in the depicted embodiment. At a high level, among other functions, the navigation manager 150 may be responsible for detecting and interpreting intent signals of various types from one or more individuals authorized to provide guidance regarding movements of the autonomous vehicle, and for identifying or selecting paths to be taken by the vehicle at least in the vicinity of a destination (e.g., in a parking lot near a building which the individual is going to enter after exiting the vehicle) in accordance with the intent signals and other input data. In the context of an autonomous or partially autonomous vehicle, an intent signal, as the term is used herein, refers to a signal generated by a non-driving individual, which indicates an objective associated with a journey being undertaken using the vehicle. Intent signals may also be referred to as intention signals herein. A non-driving individual may be defined as one who is not currently using a steering wheel or other traditional control mechanisms of the vehicle. In various embodiments, at least a subset of the intent signals may be obtained via sensor devices or interfaces that are mechanically decoupled from steering or other control subsystems of the vehicle. For example, if the vehicle comprises a steering wheel, some or all of the signals may be detected using sensor devices which are not physically attached to or part of the steering wheel.

Objectives or intentions regarding the vehicle journey may be indicated using a variety of signal types and interfaces, and at various different levels of granularity in different embodiments. For example, the intent of the individual may be indicated by some combination of a voiced command, a gesture or gaze, a touch-sensitive graphical user interface, a movement of a phone or other handheld/portable device to indicate a desired direction of movement, and so on. In at least one embodiment, an individual may indicate a task or activity that the individual wishes or intends to accomplish, and the navigation manager may translate the task/activity into a sequence of trajectory changes or vehicular movements to facilitate the task. Individual ones of the sensors 125 and/or the environmental data sources may comprise, for example, video and/or still cameras, depth sensors or cameras, inertial sensors, electromagnetic signal detectors, ultrasonic signal detectors, radar signal detectors, microphones, remote control devices, and the like. For gaze detection, in addition to still or video cameras, non-camera-based optical sensors or EMG (electromyography) sensors may be used in some embodiments.

According to at least some embodiments, an indication of a destination of a journey may be obtained by the navigation manager 150. For example, a street address or a name of a large retail establishment, a hospital, an office building, or the like may be indicated via a voiced command, a map or GPS interface and the like. The information regarding the destination may be sufficient to generate a route using one or more roads or highways for the autonomous vehicle, enabling the vehicle to reach the vicinity (at least in some cases) without substantial guidance. However, the destination may have numerous potential vehicle stopping points (e.g., parking spaces or slots) associated with it, and a final decision regarding exactly which stopping point should be selected for the vehicle may have to be made after the vehicle has reached the vicinity of the destination. For example, if the destination is a large retail store, a train station, or an airport, there may be several different entrances, of which only a few may be appropriate for the vehicle's occupants given their objectives and the current state of the parking or traffic nearby. In various scenarios, it may not be possible to select the particular stopping point (or even a general sub-area within the vicinity of the destination within which a particular stopping point should be identified) before the vicinity of the destination is reached, e.g., because of dynamically changing occupancies of the stopping points and/or because of dynamically changing intentions of the individual. In at least one embodiment, when the vehicle nears the destination, the navigation manager 150 may detect that the vicinity of the destination has been reached, and request that an authorized occupant provide some input regarding a preferred stopping point or intent.

Using the sensor devices 125, one or more signals generated by an individual permitted to provide guidance with respect to movements of the vehicle may be detected. The signals may be generated either in response to a request from the navigation manager, or on the individual's own initiative. The signals may be usable by the navigation manager 150 to identify a potential path towards a particular vehicle stopping point (e.g., a particular parking space near a selected entrance to a building) or a group of stopping points in the depicted embodiment. For example, if a large retail store has a main entrance, a separate gardening supplies entrance, and another separate entrance for picking up large appliances, and the authorized occupant of the vehicle indicates an intent to purchase gardening supplies, a parking space near the gardening entrance may be more appropriate than a parking space near one of the other entrances. Based at least in part on the signals from the individual, and/or on data collected about the external environment (such as approaching vehicles which may be in the way, occupied parking spaces, etc.) obtained from environment data sources 115, one or more vehicular movements (e.g., continuing moving in the current direction, making a turn, etc.) to enable the vehicle to proceed along a selected path may be identified. Motion directives 162 to implement the vehicular movements may be transmitted to one or more of the motion control systems 170, causing the vehicle to progress towards a particular stopping point.

In the depicted embodiment, the navigation manager may comprise a number of subcomponents, including for example an identity verifier 151, a vicinity-based interaction initiator 152, a stopping point option generator 153, one or more intent signal interpreter(s) 154, a feedback/approval coordinator 155, and/or a directive generator 156. The identity verifier 151 may be responsible for ensuring that only intent signals generated by authorized individuals are used to guide the navigation of the vehicle. A number of techniques may be used to identify authorized individuals in different embodiments, including for example biometric signals, electronic identification devices such as keys which emit electromagnetic signals with particular characteristics, and so on. In some embodiments, more than one individual may be permitted to provide navigation guidance with respect to a particular autonomous vehicle, and the identity verifier 151 may assign relative priorities to the different individuals so that, at a given point in time, the navigation manager is able to resolve any conflicting intent signals from multiple individuals. As discussed below in further detail, in at least one embodiment, an individual may provide an intent signal (e.g., to adjust the position of the vehicle slightly so that it is better aligned with the boundaries of a parking space) from outside the vehicle, and the identity verifier 151 may be designed to check such non-occupant individuals' identities in such embodiments.

The vicinity-based interaction initiator 152 may be responsible for determining when the vehicle has reached within a threshold distance of a destination or destination vicinity, and requesting an authorized individual to provide an intent signal indicating preferences for stopping points. Examples of interfaces and signal modalities which may be used to interact with individual to request and/or receive intent signals are provided below. It is noted that in various embodiments, by default, the navigation manager may choose a methodology to be used to select a stopping point if no input is provided by the authorized individual. For example, in the scenario where the destination is a large retail store with one main entrance and several other entrances, a parking space near the main entrance may be selected by default.

In at least one embodiment, given a general indication of a destination such as an office building or a retail store, stopping point option generator 153 may be able to populate a list of possible or likely stopping points. Such a list may be based on a variety of factors in different embodiments, including for example various tasks associated with the destination which the occupants of the vehicle have performed in the past. With respect to a particular office building, in one example scenario the navigation manager may have access to records indicating that (a) a particular entrance E1 is near a cafeteria, that (b) an occupant of the vehicle often has lunch at the cafeteria and (c) that the current time corresponds approximately to a time at which the occupant has eaten lunch frequently in the recent past. Given this information, the option generator 153 may include a parking space near E1 in a list of stopping points likely to be of interest to the occupant. In at least some embodiments, as discussed below in further detail, a context-dependent drop-down menu of options to be used for a text-based interface usable to indicate the occupant's intent may be generated with the help of stopping point option generator 153.

Signals of various types, such as gestures, changes of gaze, voice signals, touch-screen based signals, and the like may be used singly or in combination by individuals to indicate their intent regarding the movement of the vehicle in the depicted embodiment, One or more intent signal interpreters 154 may be responsible for processing the information provided by sensors 125, in effect translating the received signal information into approximate goals regarding the future position of the vehicle. The approximate goals may then be converted into specific lower-level motion directives 162 (e.g., "move the vehicle forward M1 meters", then "turn right and move M2 meters") that can be provided to the control subsystems 170 by directive generator 156. The different types of signals (e.g., gestures versus gaze versus voice versus touch-screen signals) may be referred to as respective signaling modes or signal modalities, and the analysis of combination of signals of different modalities from an individual to gauge the individual's preferences or intentions may be referred to as multimodal signal analysis; as such, systems similar to those shown in FIG. 1 may also be referred to as multimodal signal analysis systems. In some embodiments, a combination of several signaling modes may be used to indicate an individual's intent—e.g., a voiced command "park over there" may be accompanies by a gesture indicative of the direction corresponding to the word "there".

In at least some embodiments, a feedback/approval coordinator 155 of the navigation manager 150 may be configured to determine, prior to the issuance of at least some motion directives 162, that the planned motion is acceptable or in accordance with the goal or intent of the individual providing the navigation guidance. The feedback/approval coordinator may be implemented, for example, as a voice-based assistant, or using a display device on which the effect of the proposed motion directives on the position of the vehicle can be shown. The feedback/approval coordinator 155 may, in effect, request the individual to confirm various decisions made by the navigation manager regarding the vehicle's trajectory. In some cases, the intent of the individual may be ambiguous or hard to translate into specific motion directives, and the feedback/approval coordinator may attempt to disambiguate among the choices by involving the individual. For example, if a respective unoccupied parking space is available near two different signs (sign A and sign B) in a parking lot, and the individual has made a gesture that could be interpreted to mean the vehicle should be parked near either of the signs, the feedback/approval coordinator 155 may generate the logical equivalent of the query "Did you mean 'park near sign A', or 'park near sign B'?". The feedback provided by the individual may be used to select a particular set of motion directives to be issued by the navigation manager in such scenarios.

In addition to local sensors 125 usable to detect vehicle occupant-generated signals and environmental data sources 115, the navigation manager 150 may also utilize one or more communication devices 120 in the depicted embodiment, e.g., to obtain data from various remote databases and the like. Such data obtained from remote sources may include, for example, map records, records of local traffic laws, records of the previous history of tasks/activities performed by vehicle occupants and the like, any combination of which may be helpful in determining motion directive options for the vehicle in various embodiments. In one embodiment, the communication devices 120 may be used to communicate with other autonomous or partially-autonomous vehicles during the course of the journey or in the vicinity of the destination. For example, a different autonomous vehicle may provide an indication of a portion of a parking area with numerous parking spaces via such communications.

Figure 2:
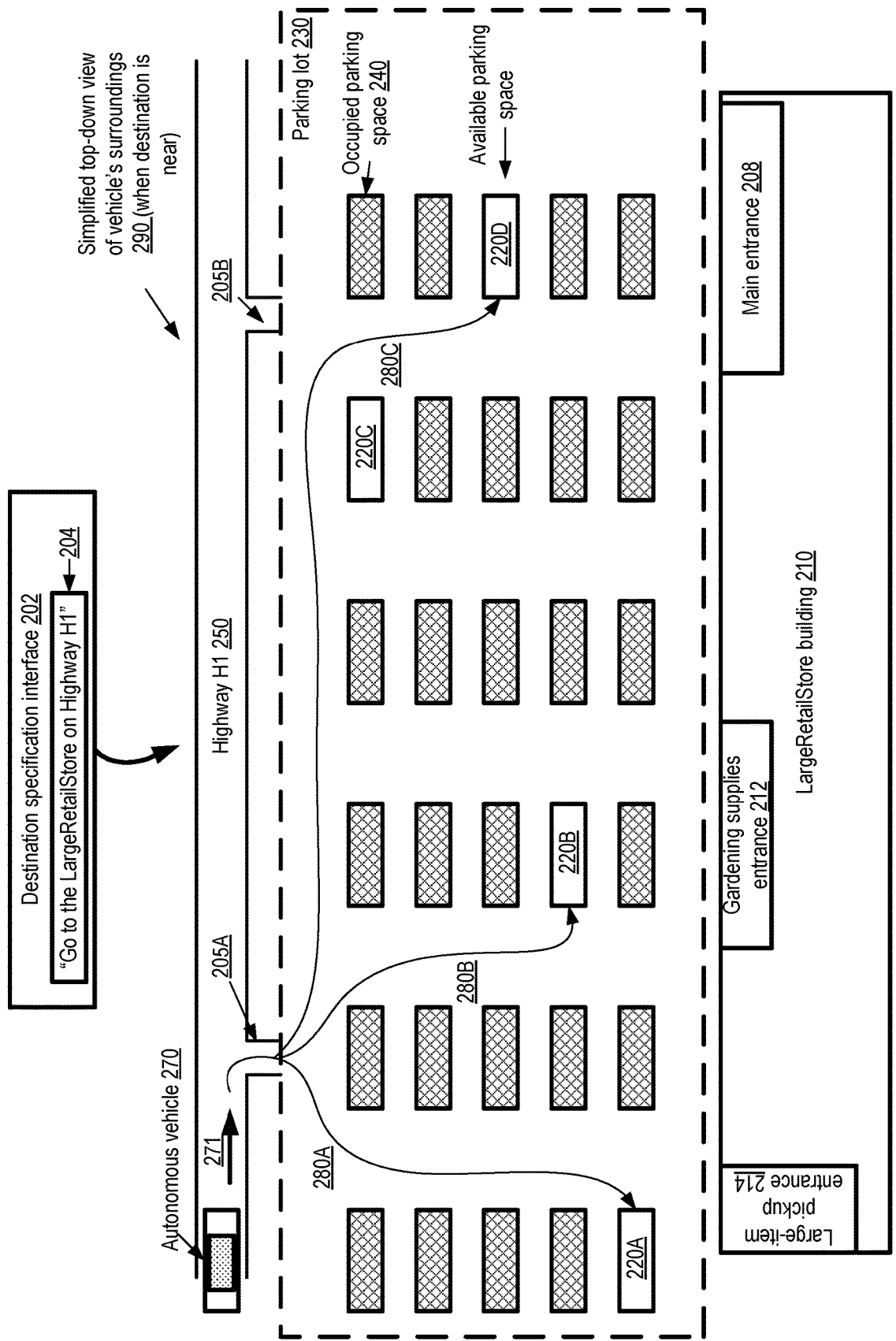
FIG. 2 illustrates an example parking lot within which navigation decisions may be made by components of an autonomous vehicle based on intent signals, according to at least some embodiments.

As mentioned earlier, intent signals of various modalities may be useful in scenarios involving parking decisions, especially in large parking lots in which the distance between the selected parking space and an entry/exit of a building may be substantial. FIG. 2 illustrates an example parking lot within which navigation decisions may be made by components of an autonomous vehicle based on intent signals, according to at least some embodiments. In the depicted scenario, an individual has indicated, using a destination specification interface 202 (such as a text-based interface, a voice-based interface, or a map-based interface), that an autonomous vehicle 270 is to proceed to a store named "LargeRetailStore1" on a highway "H1". Based on the information 204 provided via interface 202, the navigation manager of vehicle 270 may thus have determined the vicinity of the destination, but the precise stopping point (e.g., parking space) to which the vehicle should be taken may not be selectable based on the information 204 alone. A simplified top-down view 290 of the vehicle 270's surroundings as it nears LargeRetailStore1 along highway H1 is shown.

LargeRetailStore1 has a parking lot 230 which may be considered part of the destination vicinity. At the time at which vehicle 270 nears the parking lot 230, several of the parking spaces are occupied (indicated by the label 240), while other parking spaces 220 are available (such as spots 220A, 220B, 220C and 220D). Two entrances/exits 205A and 205B can be used to enter parking lot 230 from Highway H1 (and/or to leave the parking lot) in the depicted scenario.

The LargeRetailStore1 building 210 has several entry/exit points: a main entrance 208, a second entrance 212 for gardening supplies, and a third entrance 214 for picking up large items such as appliances. In the depicted embodiment, the navigation manager of the autonomous vehicle 270 may select a particular available parking space 220 based at least in part on detected intent signals from an occupant of the vehicle who is authorized to provide navigational guidance. For example, if the individual indicates an intent to pick up an appliance, parking space 220A near entrance 214 may be selected as a stopping point for vehicle 270, and path 280A may be taken to reach parking space 220A. If the individual indicates an intent to buy gardening supplies, parking space 220B near entrance 212 may be selected and path 280B may be taken. If the individual indicates an intent to use the main entrance 208, available parking space 220D may be selected, and path 280C may be taken. In addition to or instead of indicating entrances or exits, in some embodiments the intent signals detected by the navigation manager may indicate other semantic features of buildings, such as loading docks, wheelchair ramps, and the like. In some cases the features may be signaled by the individual using natural language phrases such as "where the sidewalk starts". In at least some embodiments, by default, the navigation manager may select the main entrance 208 as the one most likely to be used, and as a result a parking space near the main entrance may be selected as the stopping point if no guidance is provided by the individual. Factors other than proximity to an entrance may be used to select paths and stopping points in some embodiments. For example, if parking lot 230 is extremely crowded (e.g., not just with vehicles, but with pedestrians), and as a result exiting the parking lot is anticipated to be tedious, and the individual expresses an interest in being able to leave the parking lot quickly, parking space 280C may be selected as it is near a potential exit 205B. Any of a number of signal modalities and/or signaling interfaces may be used by the individual to provide the intent information which can be interpreted by the navigation manager to select a path towards an appropriate stopping point in the depicted embodiment, and to issue the appropriate lower-level motion directives to the motion control systems of the vehicle 270. In addition to the intent signals themselves, the navigation manager may also take into account the dynamically changing external environment of the vehicle—e.g., a different path may be selected if other vehicles and/or pedestrians appear to obstruct the first path identified to a selected parking space, or a different parking space may be selected if one becomes available (or if a targeted parking space becomes occupied).

Figure 3:
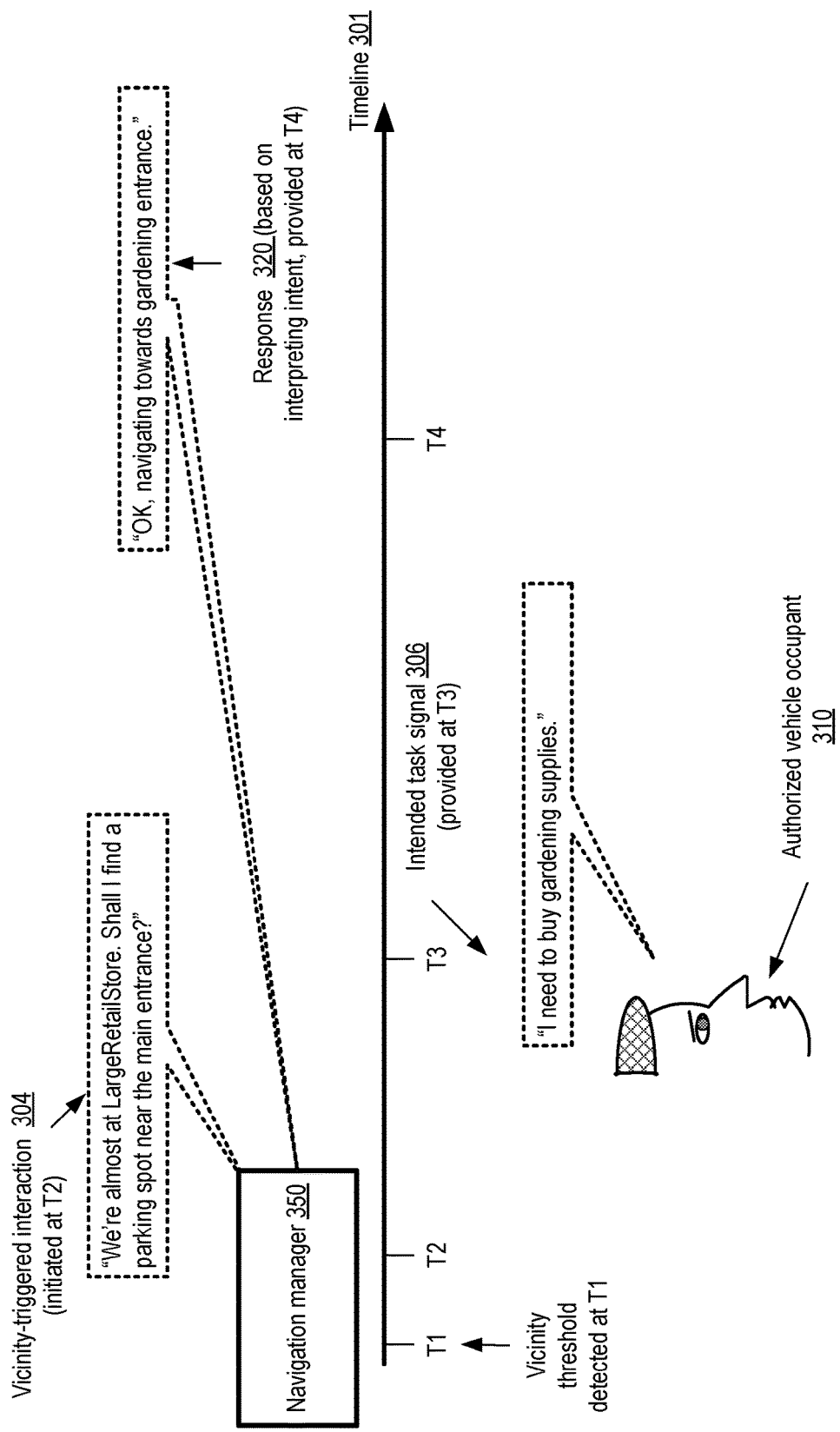
FIG. 3 illustrates an example interaction between a navigation manager of an autonomous vehicle and an occupant of the vehicle, according to at least some embodiments.

FIG. 3 illustrates an example interaction between a navigation manager of an autonomous vehicle and an occupant of the vehicle, according to at least some embodiments. At a time T1 along timeline 301, a navigation manager 350 of an autonomous vehicle detects that a threshold distance to a destination has been reached, indicating that the vehicle is now near enough to the destination that intent signals from an occupant may be useful. Accordingly, a voice-based vicinity-triggered interaction 304 is initiated in the depicted embodiment at a time T2 shortly after T1. To start the interaction, navigation manager 350 informs the occupant(s) of the vehicle that the destination "LargeRetailStore" is near, and requests the occupants to indicate whether parking near the main entrance of LargeRetail Store is acceptable.

At time T3, in response to the query from the navigation manager, an occupant 310 authorized to provide navigation guidance provides a verbal signal 306 of an intended task (an example of an intent signal). The individual may, as shown, indicate an intent to buy gardening supplies. In some cases, the intent signal may simply indicate the task to be performed, and the navigation manager may be responsible for translating the "buy gardening supplies" task to a particular part of a parking lot "near the gardening entrance". In other scenarios, the intent signal may provide some additional guidance such as an indication of a landmark or sign: e.g., the individual may say something similar to "I'd like to buy gardening supplies. Can we park near that entrance with the green 'gardening' sign?" or "I'd like to buy gardening supplies. Can we park near the entrance where those customers are exiting with potted plants in their carts?" The navigation manager may parse/interpret the intent signal 206 and consult a mapping database, other data sources, as well as information collected about its external environment (e.g., a sign that is labeled "Gardening Entrance" or the like) to identify options with respect to stopping points in view of the individual's intent. A response 320 to the intent signal may be provided at time T4 in the depicted example scenario, e.g., after the navigation manager 350 has (a) interpreted the intent signal(s) 306 and (b) identified at least an initial portion of a path towards a stopping point which would facilitate the intended task.

Figure 4:
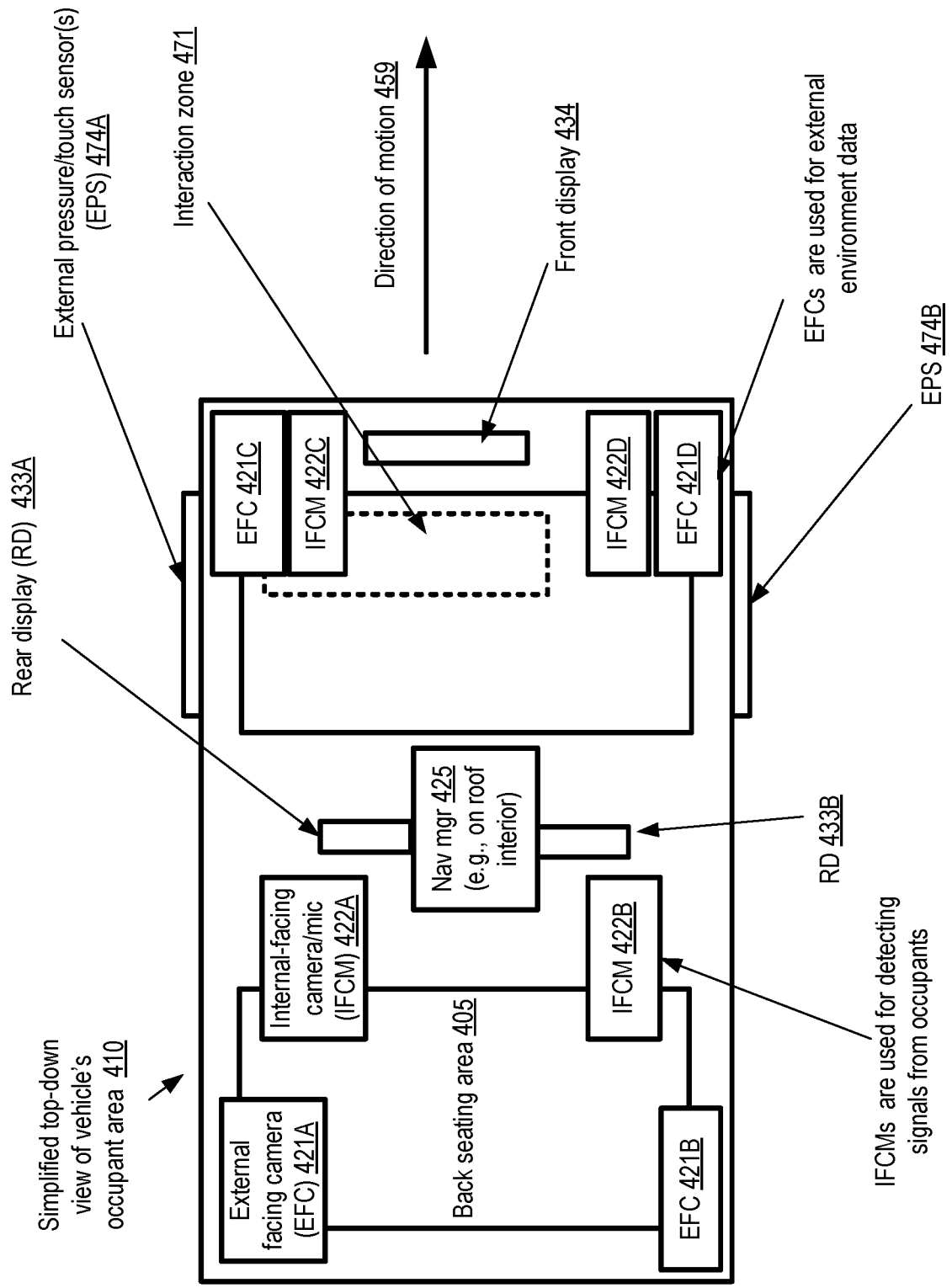
FIG. 4 illustrates an example vehicle environment comprising a plurality of sensors which may collect data that can be analyzed to determine the intended tasks or goals of individuals authorized to provide navigation guidance, according to at least some embodiments.

FIG. 4 illustrates an example vehicle environment comprising a plurality of sensors which may collect data that can be analyzed to determine the intended tasks or goals of individuals authorized to provide navigation guidance, according to at least some embodiments. A simplified top-down view 410 of the vehicle's occupant area is provided. The vehicle may, for example, comprise a car, truck, golf-cart, all-terrain vehicle, or the like. In at least some embodiments, at least some of the movements of the vehicle may not require direct human control—e.g., the vehicle may be able to park itself automatically, drive under some conditions without being guided by a human, and so on. Objects and regions which may be located at different depths with respect to each other (and may thus be obscured by each other or by other objects) in the vehicle are shown, even though at least some of the objects or regions may not actually be visible simultaneously in a more realistic depiction. As indicated by arrow 459, the vehicle may be moving from left to right in FIG. 4. The vehicle may include two rows of seating areas in the depicted embodiment: front seating area 402 and back seating area 405. For example, in one scenario two occupants may sit in each of the seating areas. One or more of the occupants in either row may be authorized to provide navigational guidance for the vehicle in the depicted embodiment, e.g., using intent signals rather than a steering wheel or other conventional mechanisms.

The signal detection components of the vehicle may be designed to capture gesture, gaze, voice and/or touch-based signals from the occupants, and environmental signals from the exterior of the vehicle. Respective sets of internal-facing cameras and microphones (IFCMs) 422, such as IFCMs 422A-422D, may be configured to capture some types of indications of intent from the occupants. Although four IFCMs are shown, so that respective IFCMs may be used for capturing signals from respective occupants in a four-occupant scenario, the relationship between IFCMs and occupants need not be one-to-one in various embodiments. For example, a single camera and/or a single microphone may be used to collect signals from multiple occupants in some embodiments, and conversely, multiple cameras and/or microphones may be used to capture a single occupant's signals in some conditions. In some cases, the mapping between the IFCMs 422 and the occupants may change with occupancy—e.g., if there are only two occupants during some time period, two IFCMs may be directed towards each of the occupants; later, if two more occupants occupy the vehicle, one IFCM may be directed towards each occupant. In addition to or instead of IFCMs, other devices (which may be portable or moveable, and not physically attached to or incorporated within the vehicle), such as phones, tablet computers or the like may also be used to capture intent signals in various embodiments.

Four external facing cameras (EFCs) 421A-421D may capture the scenes viewable from various parts of the moving vehicle in the depicted embodiment. As with the IFCMs, the relationship between EFCs and occupants need not necessarily be 1:1 in at least some embodiments. A local navigation manager 425 comprising one or more computing devices may be located in the vehicle of FIG. 4, e.g., attached to the interior roof or below the seats. In some embodiments, the local navigation manager 425 may perform at least some of the analysis of the signals collected by the IFCMs and the EFCs to help identify candidate options for movements and paths to be taken by the vehicle. In other embodiments, the local navigation manager 425 may offload some or all of the signal analysis and interpretation workload to one or more servers at a data center—e.g., the local component may transmit representations of the signals to the servers, receive the results of analyses performed at the servers, and so on. In addition to a front display 434, the vehicle may also include one or more rear displays (RDs), such as RD 433A and 433B in the depicted embodiment. Gestures made by one or more occupants, e.g., within a special three-dimensional interaction zone 471 and/or elsewhere in the vehicle may be used to signal intent, and may be interpreted by the navigation manager to select paths, generate motion directives, and so on. In at least some embodiments, multiple interaction zones 471 may be established within the vehicle, e.g., for respective occupants.

In the embodiment shown in FIG. 4, the vehicle may also be equipped with external pressure/touch sensors 474, such as 474A or 474B. Such sensors may be used, for example, to adjust the position of the vehicle by authorized individuals while the individuals are outside the vehicle, as discussed below in further detail.

Figure 5:
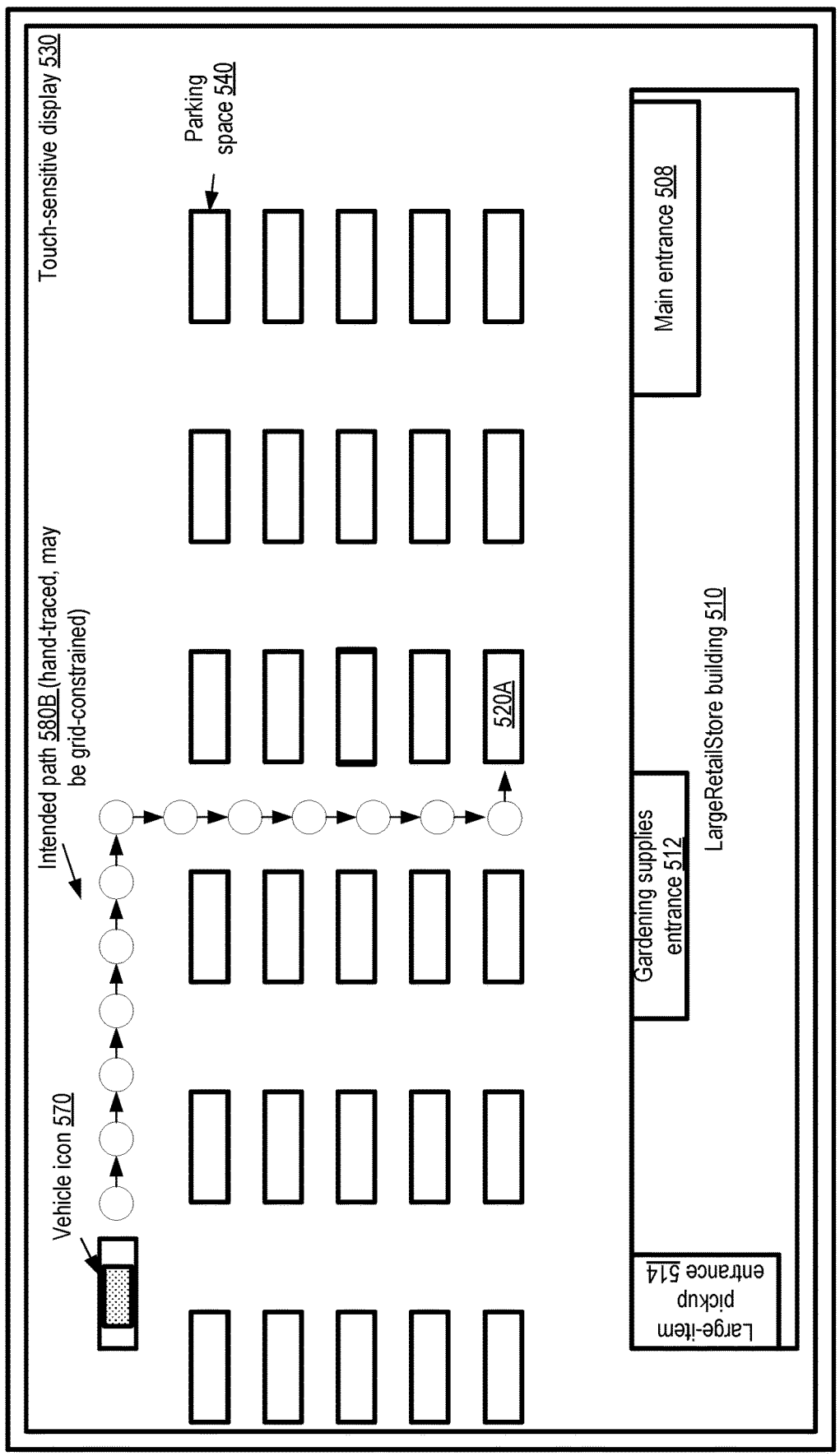
FIG. 5 illustrates an example touch-based interface which may be used by a vehicle occupant to trace a detailed path towards a termination point of a journey, according to at least some embodiments.

FIG. 5 illustrates an example touch-based interface which may be used by a vehicle occupant to trace a detailed path towards a termination point of a journey, according to at least some embodiments. In the depicted embodiment, a touch-sensitive graphical user interface display 530 of a device within the vehicle may be populated with a representation of the surroundings of the vehicle. Such touch-sensitive graphical user interfaces may also be referred to herein as "touch screens". The current position of the vehicle itself may be represented, for example, by an icon 570 in the display, and dynamically updated as the vehicle moves. In the depicted scenario, the LargeRetailStore building 510 with its entrances 508, 512 and 514 may be shown, together with various parking spaces 540 of the associated parking lot. The information displayed may be based on some combination of static information collected by the navigation manager of the vehicle (e.g., from a mapping database, a satellite-based imaging database, or the like), and sensor information being collected by the vehicle's externally-oriented sensors. For example, in one embodiment, the general layout of the parking lot may be obtained from a static database, and the general layout information may be overlaid in the display with a representation of the (currently occupied versus currently unoccupied) status of at least some nearby parking spaces for which data can be collected by the vehicle's sensors.

An occupant of the vehicle may trace an intended path 580B towards a stopping point 520A for the vehicle using the touch screen in the depicted embodiment, e.g., by pressing down on the display of the vehicle icon 570 with a finger and displacing the icon in the desired direction of movement. In some embodiments, the graphical view of the surroundings may define a grid representing a plurality of discrete path segments which can be traversed by the vehicle within the destination vicinity. That is, the path traced by the individual may be constrained by the display, and arbitrary paths (such as paths which diagonally traverse multiple parking spaces) may not be permitted. The navigation manager may detect the individual's intended path by interpreting the individual's interactions with the screen, and issue corresponding motion directives to cause the vehicle to move along the path to the extent that such movements are feasible and safe (e.g., if some obstacle blocks movement along the path, the navigation manager may pause the movement of the vehicle and/or deviate from the intended path). The display may be dynamically updated as the vehicle moves. The individual may not have to specify the entire path to an intended stopping point all at once in the depicted embodiment—instead, for example, only the next few desired movements of the vehicle may be indicated at a given point in time.

In one embodiment, an individual may use an interface similar to that shown in FIG. 5 to specify (e.g., using a particular icon such as a "pin" icon) a targeted location (such as a particular entrance of the building 510, or a particular parking space) near which the individual wants the vehicle to be stopped, or to which the vehicle should be moved, without necessarily tracing a path to the targeted location. The navigation manager may translate the indication of the targeted location provided via the interface to a feasible path and generate the appropriate motion directives accordingly.

In some embodiments, the touch screen display 530 may be part of a portable computing device (e.g., a tablet computing device or a smart phone) which is not necessarily or permanently integrated as a component of the navigation manager or of the vehicle. In other embodiments, a dedicated touch screen-equipped device intended primarily or exclusively for navigation-related interactions of the vehicle may be employed. In one embodiment, the device may connect wirelessly with other components of the vehicle, while in another embodiment a wired connection may be used.

Figure 6:
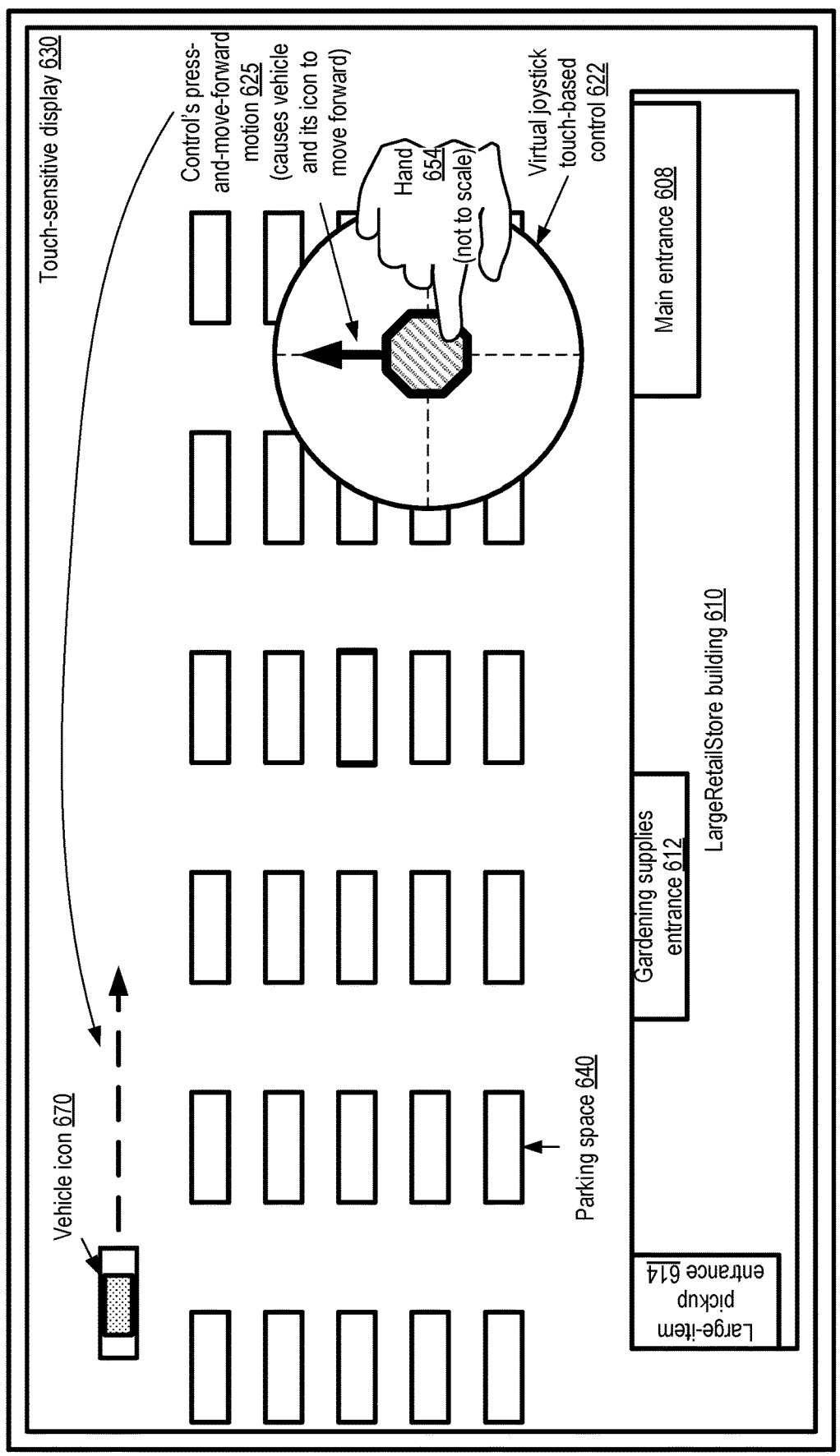
FIG. 6 illustrates an example touch-based virtual joystick interface which may be used by a vehicle occupant to indicate desired movements of the vehicle relative to its current position, according to at least some embodiments.

In some embodiments, instead of using the path tracing approach discussed in the context of FIG. 5, other types of touch-based interfaces may be used to provide intent signals navigational guidance. FIG. 6 illustrates an example touch-based virtual joystick interface which may be used by a vehicle occupant to indicate desired movements of the vehicle relative to its current position, according to at least some embodiments. As shown, the touch-sensitive display 630 may provide a representation of the surroundings of the vehicle in the vicinity of the journey destination, with the current position of the vehicle itself being represented by icon 640. In the scenario shown in FIG. 6, the vehicle is in the parking lot adjacent to a LargeRetailStore building 610 with three exits 608, 612 and 614, similar to the environment illustrated in FIG. 5.

In the depicted embodiment, a virtual joystick touch-based control 622 is superimposed on the underlying representation of the vehicle's surroundings. The control 622 may, for example, comprise a circular region at whose center a joystick icon is located by default. When the joystick icon (shown as a shaded octagon in FIG. 6, although any of a variety of shapes or other icons may be used in various embodiments) is pressed on and moved forward by an individual authorized to provide navigational guidance, e.g., using a hand 654, this is interpreted as an intent to move the vehicle forward (without changing its current orientation or direction of motion). The press-and-move-forward motion 625 is translated by the navigation manager into one or more motion control directives which cause the vehicle to proceed forward. As soon as the individual stops pressing the joystick icon, it may revert to its default position in the center of the control. In some embodiments, the extent to which the joystick icon is moved towards the circumference of the circle may be interpreted as an indication of how far the vehicle should be moved in the indicated direction. In one example scenario, assume that the radius of the circle containing the joystick icon is three centimeters. If, for example, the joystick is moved two centimeters forward, this would indicate that the vehicle should be moved forward twice as far forward as in the case the joystick is moved one centimeter forward. In one embodiment, the relative speed at which the joystick icon is moved may be considered indicative of the relative speed at which the vehicle should be moved. If the joystick is moved to the right instead of forward, the navigation manager may generate directives to turn the vehicle right (assuming that the external environment sensors indicate that a right turn is feasible from the current location of the vehicle). Similarly, if the joystick is moved to the left or backwards (downwards in FIG. 6), the vehicle may be made to turn left or move backwards (assuming those trajectory changes are feasible).

As the navigation manager responds to the input received from the individual's hand 654 via control 622, the icon 670 may be repositioned on the graphical user interface to reflect the change in the vehicle's location, and the map shown in the background may be re-centered as well in the depicted embodiment. Eventually, using the intent signals from the joystick interface, the vehicle may be moved to a suitable parking space 640 for the task the occupants wish to accomplish. In some embodiments, other interfaces similar to the virtual joystick, such as a virtual trackball interface, may be used. In one embodiment, instead of a virtual joystick or trackball, a physical joystick or trackball may be used.

Figure 7:
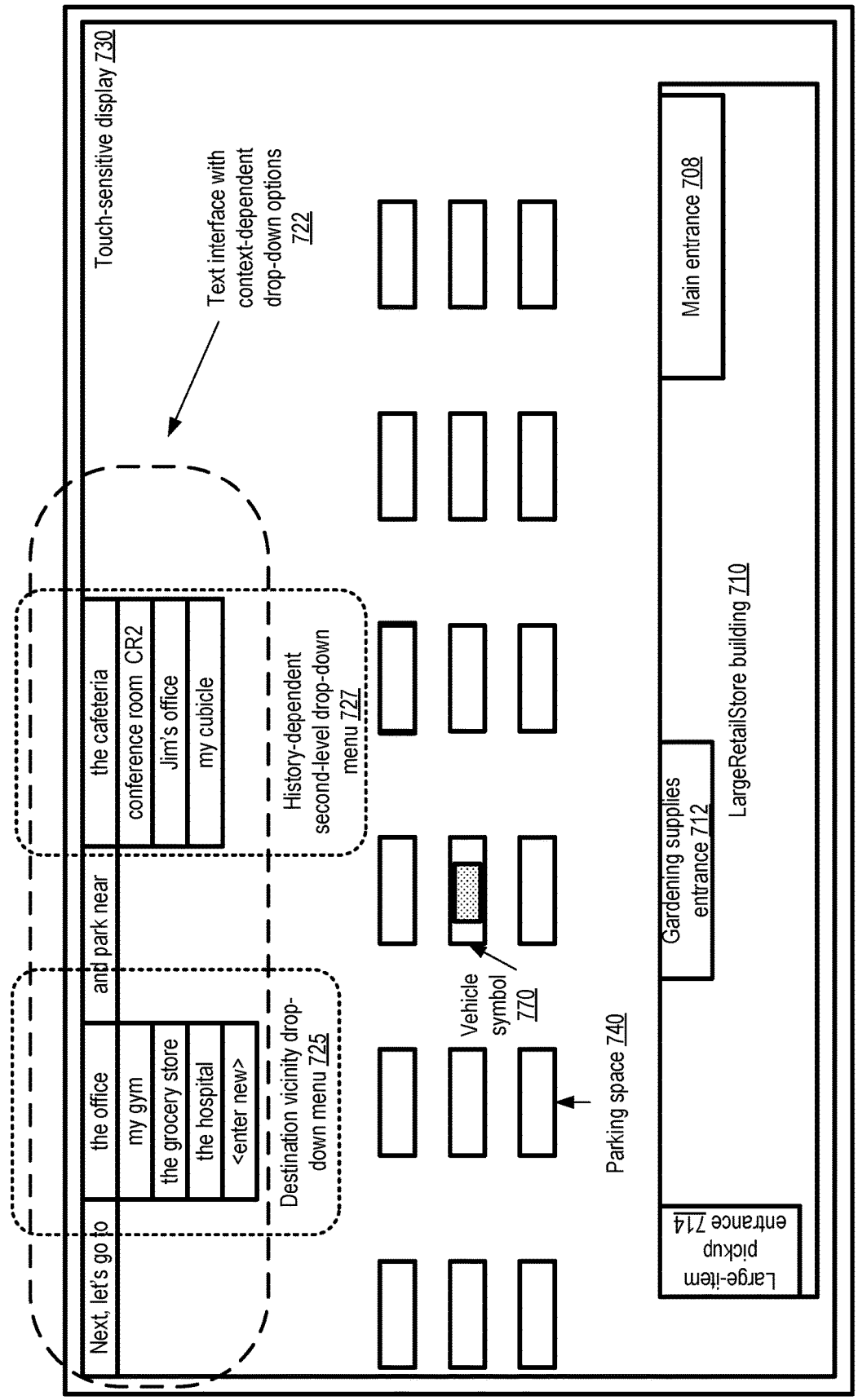
FIG. 7 illustrates an example text-based interface with entries which may be pre-populated based on task contexts to provide navigation guidance, according to at least some embodiments.

FIG. 7 illustrates an example text-based interface with entries which may be pre-populated based on task contexts to provide navigation guidance, according to at least some embodiments. In the depicted embodiment, a touch sensitive display 730 shows that a corresponding vehicle (represented on the display by icon 770) is currently positioned at one of the parking spaces 740 within a parking lot adjacent to a LargeRetailStore building 710 with three entrances 708, 712 and 714.

An individual authorized to provide navigational guidance for the vehicle may be permitted to select various combinations of options from a text-based interface 722 using multi-option menus. For example, two levels of detail regarding a next destination of the vehicle may be provided using respective drop-down menus 725 and 727. Drop-down menu 725 may be pre-populated with a number of personalized destination choices corresponding to the individual to whom the menu is presented—e.g., "the office", "my gym", "the grocery store", "the hospital", etc. As indicated by the lack of exact addresses associated with the example choices shown, the navigation manager may express destination vicinity information in informal terms similar to those that would be used by a person familiar with the activities of the individual. Thus, instead of supplying an address such as "1010 Main Street" at which the office of the individual is located, the informal phrase "my office" may be used to populate one of the option slots of the drop-down menu 725. The set of options may be selected based on the context-dependent history of journeys undertaken by the individual in the past in some embodiments—e.g., if the individual typically heads to the office at around 8:30 AM on a weekday and the current time is 8:15 AM on a Monday, "the office" may be considered one of the more probable choices for a next destination.

A second-level drop-down menu 727 may be populated based on the particular option selected from the first drop-down menu in the depicted embodiment. Assume that "the office" is selected as the next high-level destination, and that the office happens to be located in a large campus with several spots often visited by the individual on whose behalf the vehicle is being navigated. In such a scenario, the navigation manager may analyze a history of stopping points in the vicinity of the office which have been used by the individual in the past to perform various tasks, and provide a list of corresponding finer-granularity destinations in the second drop-down menu 727. For example, the choices "the cafeteria", "conference room CR2", "Jim's office", and "my cubicle" are provided to the individual as places near to which the vehicle may be parked. The cafeteria may be selected as an option based, for example, on a determination that the individual often has lunch at the cafeteria at around the current time of day. The individual may often have attended meetings in the recent few weeks in a particular conference room CR2, leading to the inclusion of CR2 in the drop-down menu. "Jim" may be a manager or a colleague of the individual whose office is often visited, and "my cubicle" may be the default choice as the location at which much of the individual's normal working day is spent. In various embodiments in which text-based interfaces such as that shown in FIG. 7 are used, the navigation manager may populate elements of a multi-option menu of the interface with respective context-dependent text fragments. Individual ones of the text fragments may indicate a respective intent or intended task, e.g., from a set of tasks which the individual using the interface has performed frequently in the past, or a task which is indicated by a sign or landmark. The navigation manager may detect the task (and thereby identify a specific location or stopping point, such as a parking space, towards which the vehicle should be moved) based on the signals from the interface indicating the particular text fragment which has been selected from the multi-option menu. In various embodiments, controls enabling the individual to provide new first-level and/or second-level choices (such as the "enter new" field in menu 725) may be provided. The general goal of a text-based menu similar to that shown in FIG. 7 may be to provide a way for conversational-level input from the individual to be used by the navigation manager to transport the individual to desired destinations, and also to determine appropriate paths to be taken in the vicinity of a given destination which may have multiple entrances or multiple stopping points. In some embodiments, a multi-option menu whose options are represented by respective graphical symbols or icons other than (or in addition to) text may be used to determine the intent or task of interest to the individual.

Figure 8:
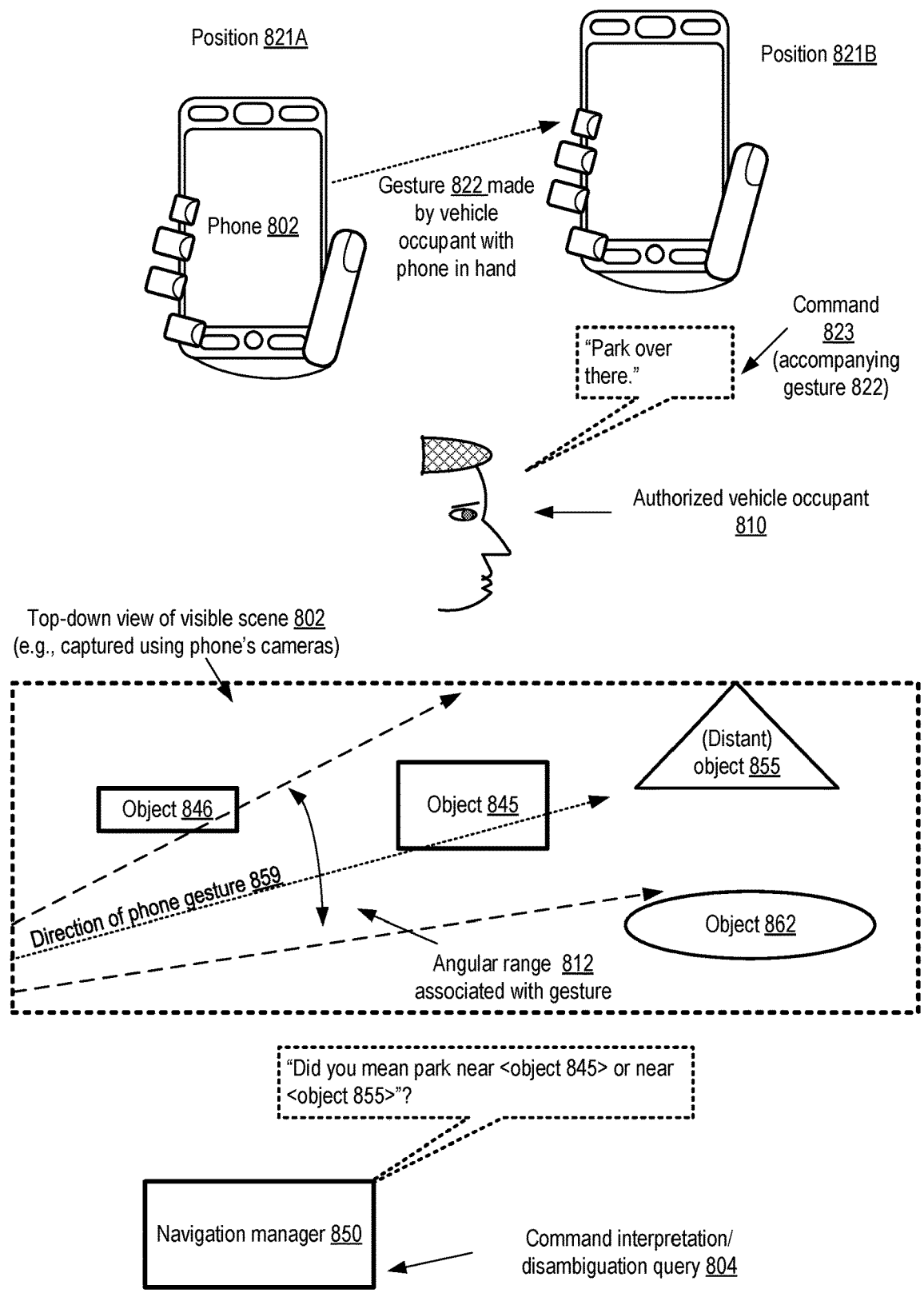
FIG. 8 illustrates an example scenario in which a gesture made using a hand-held computing device or phone may be used to provide navigation guidance, according to at least some embodiments.

FIG. 8 illustrates an example scenario in which a gesture made using a hand-held computing device or phone may be used to provide navigation guidance, according to at least some embodiments. In the depicted scenario, an occupant 810 of a vehicle who is authorized to provide navigational guidance for the vehicle, may make a gesture 822 indicative of an intent while holding a phone 802 in one of the individual's hands. The gesture 822 may displace the phone 822 from position 821A to position 821B, and the direction of the displacement of the phone may suggest the desired direction of movement of the vehicle. The gesture 822 may be accompanied by a voiced command 823, such as "Park over there" in some cases.

In order to interpret the combination of the command and gesture, the navigation manager may communicate with the phone 822 and analyze the contents of the view which is visible from the cameras and/or other sensors of the phone in the depicted embodiment. In a top-down view of the visible scene 802, obtained for example from the camera's sensors as the camera is displaced, arrow 859 indicates the direction of the phone gesture. A number of objects may be at least partly visible within some approximate angular range 812 associated with the gesture. The approximate angular range may be determined by the navigation manager in some embodiments, and may for example be based on the capabilities of the phone camera's angle of view. The set of objects partially or fully included in the angular range, and hence considered candidates for interpreting the gesture and command, may include objects 845, 846, and 855 in the depicted scenario, with object 855 being more distant than objects 845 and 846, and with objects 845 and 855 overlapping more fully with the angular range than object 846. Object 862 may not be included in the candidate set of objects, as it lies outside the angular range 812.

The candidate objects may be ranked relative to one another by the navigation manager in some embodiments, based for example on a variety of factors such as the degree of overlap of the objects with the angular range, the distances to the objects from the current location of the vehicle, the feasibility of parking near the objects (e.g., based on the approximate count of parking spaces available), an estimated level of interest of the individual regarding the objects (which in turn may be based on an analysis of the tasks performed by the individual in the vicinity in the past), and so on. In order to determine the particular object near which the individual intends the vehicle to be parked, the navigation manager 850 may issue a voiced query 804 in the depicted embodiment: "Did you mean park near <object 845> or near <object 855>?" In the example query shown, the highest ranked pair of objects are included as choices near which the vehicle could be parked. If the individual provides an affirmative response regarding one of the choices presented, the navigation manager 850 may cause the appropriate motion directives to be issued to cause the vehicle to move towards the selected choice. If the individual indicates that none of the offered choices was the one intended by the command and gesture, more options (such as object 846 or 862) may be provided in a second query, and the process may be continued until the intent of the individual is eventually determined. If the intent cannot be determined by the navigation manager 850 using a particular combination of signaling modes in various embodiments, such as the gesture and command combination depicted in FIG. 8, a different mode may be used, or manual (e.g., steering wheel-based) control of the vehicle may eventually be required from the individual.

Figure 9:
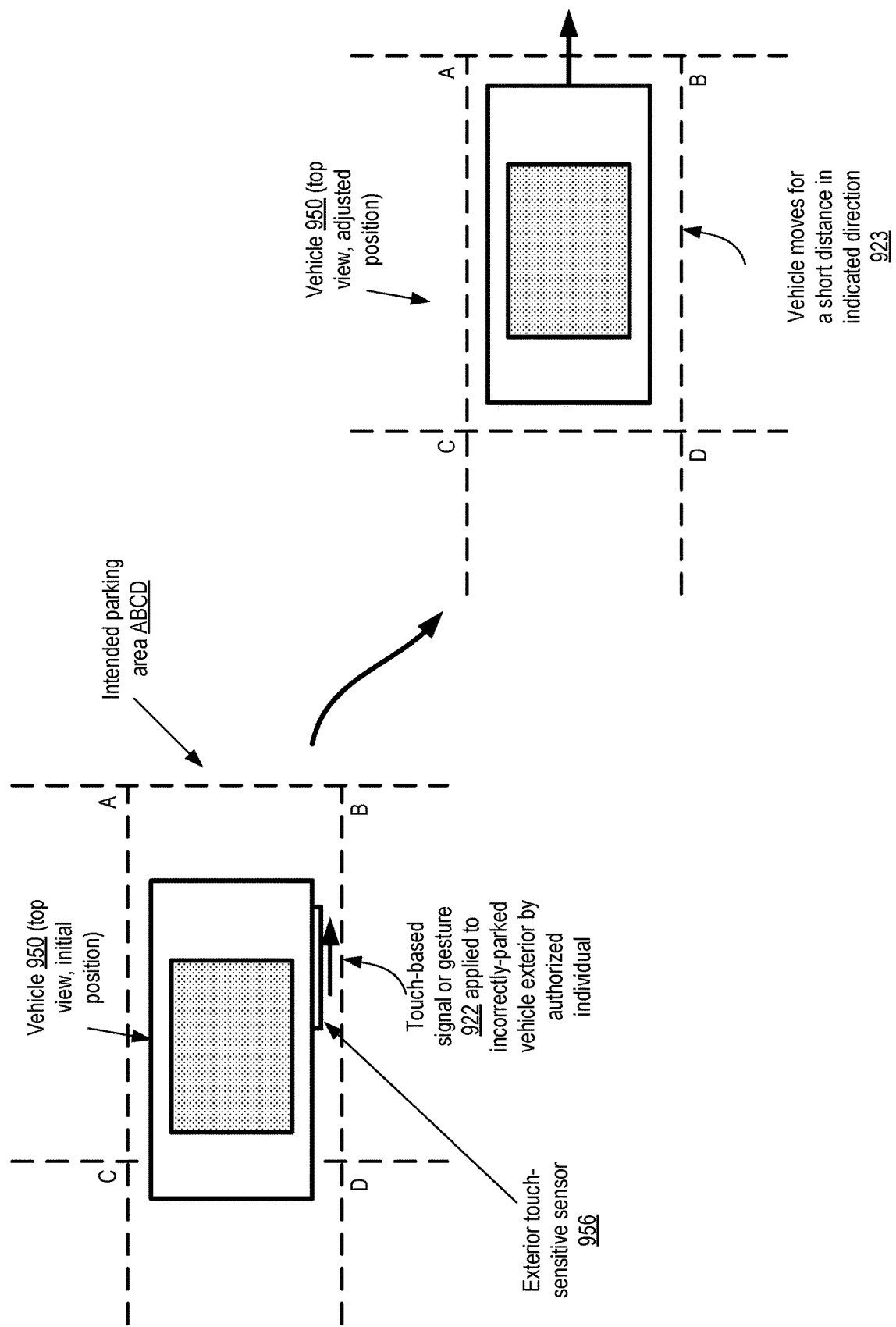
FIG. 9 illustrates an example scenario in which a gesture or touch signal provided by an authorized individual outside a vehicle may be used to guide minor adjustments of the position of the vehicle, according to at least some embodiments.

In some embodiments, the navigation manager may be provided signals of intent from outside the vehicle. FIG. 9 illustrates an example scenario in which a gesture or touch signal provided by an authorized individual outside a vehicle may be used to guide minor adjustments of the position of the vehicle, according to at least some embodiments. In the depicted scenario, after the vehicle 950 is initially parked, an individual authorized to provide navigational guidance for vehicle 950 may determine (after exiting the vehicle) that the position of the vehicle is unsatisfactory or suboptimal. The dashed lines show the intended parking space ABCD which was ideally to have been occupied by the vehicle. One end of the vehicle (either the rear or the front) may jut out slightly across the parking space boundary line CD.

The vehicle 950 may be equipped with a touch-sensitive sensor 956 on its exterior in the depicted embodiment. The authorized individual may make a touch-based signal or gesture 922, such as a swipe or gentle push towards the edge AB of the parking space, which is detectable by the touch-sensitive sensor 956. The detected signal may be processed by the navigation manager of the vehicle as an indication of a command to adjust the position of the vehicle. The navigation manager may transmit an appropriate motion directive to a motion control subsystem of the vehicle to initiate a vehicular movement in response to the command in the depicted embodiment. As a result, the vehicle may be moved a short distance 923 in the indicated direction.

In some embodiments, instead of using a touch-sensitive or pressure-sensitive sensor, one or more cameras may be used to detect intent signals from the authorized individual to adjust the position of the vehicle 950. In some embodiments in which signals from individuals outside the vehicle are used to move the vehicle, the identify verification components of the navigation may utilize multiple identification techniques to ensure that only signals from authorized individuals can be used to cause vehicular movements. For example, a biometric identification technique may be used in combination with a check that the individual providing the signals also possesses an electronic "key" for the vehicle. In some embodiments, signals from the exterior of the vehicle may be ignored by the navigation manager in accordance with a default setting, and the default setting may have to be overridden using an interface inside the vehicle before exterior signals can be used. In another embodiment, signals generated by individuals outside the vehicle may not be used for navigational purposes.

Figure 10:
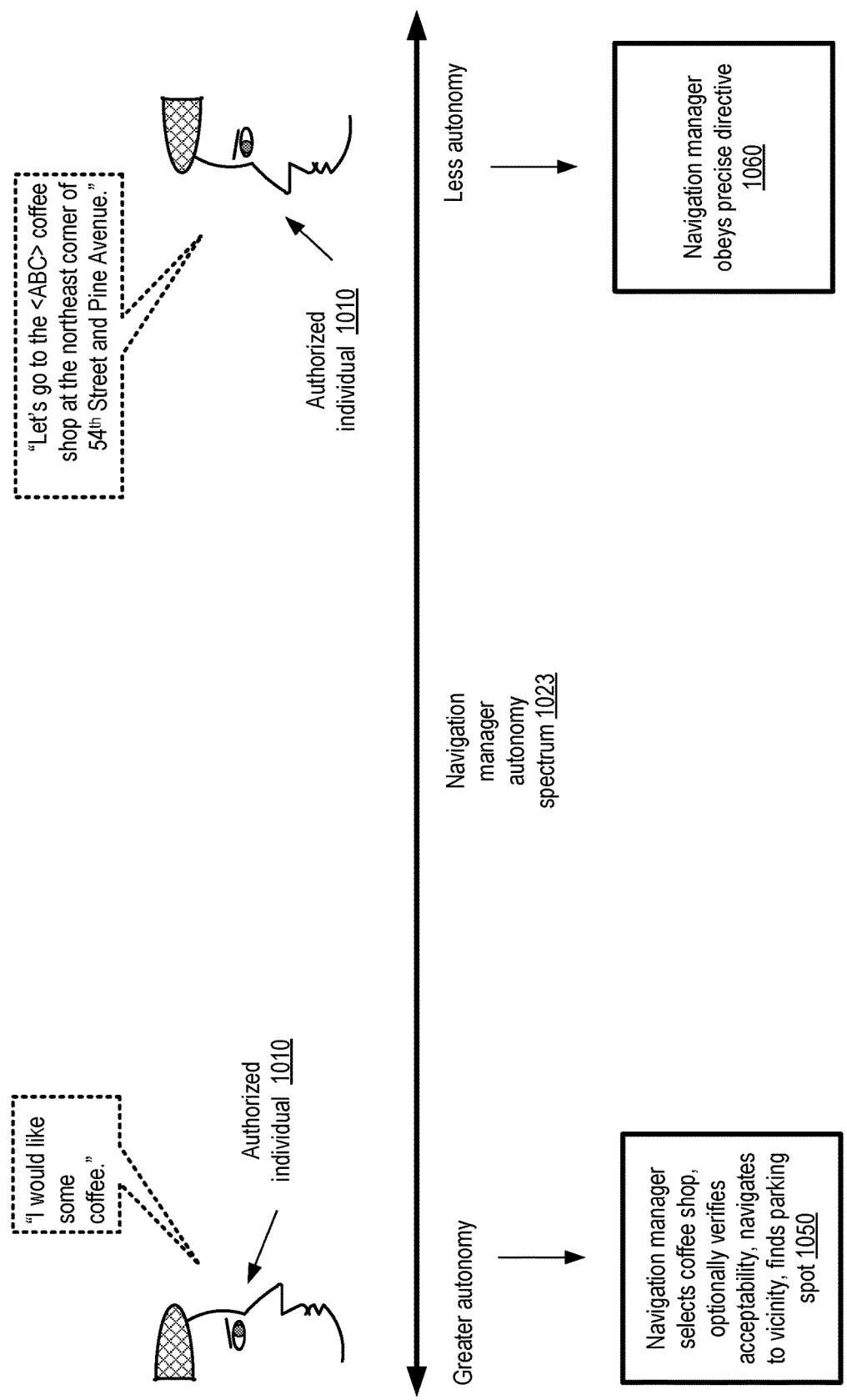
FIG. 10 illustrates an example spectrum of navigation manager autonomy, according to at least some embodiments.

In several of the example scenarios discussed above, the general vicinity of the destination of a journey may have been provided explicitly to the navigation manager, and intent signals may be used primarily after the vehicle has reached the vicinity. In some embodiments, the navigation manager may also be responsible for making decisions regarding the destination itself. FIG. 10 illustrates an example spectrum of navigation manager autonomy, according to at least some embodiments. Along the spectrum 1023, situations involving a greater degree of autonomy of the navigation manager are shown towards the left, and situations involving a smaller degree of autonomy are shown towards the right.

At one extreme (the greater-autonomy extreme), an individual 1010 authorized to provide guidance regarding the vehicle's movements may simply express a general objective or goal regarding an activity or task. For example, the individual may say something similar to "I would like some coffee", without being more specific about a particular coffee shop or provider, or even any details regarding the kind of coffee, etc. In such a scenario, the navigation manager may for example select a particular coffee shop, verify the acceptability of the particular coffee shop, issue directives to reach the vicinity of the coffee shop, and find a parking space near the entrance to the coffee shop, as indicated in block 1050. The coffee shop may be selected, for example, based on some combination of factors such as a history of coffee shop usage by the individual 1010, proximity to the current location of the vehicle, coffee prices, etc. The individual 1010 may in effect leave most of the decision making to the navigation manager, although the individual may of course override the choices made by the navigation manager (e.g., at the coffee shop level and/or at the parking space level).

In contrast, at the other end of the autonomy spectrum 1023, the individual 1010 may provide a more precise directive, such as the equivalent of "Let's go to the <ABC> coffee shop at the corner of $54^{th}$ Street and Pine Avenue". In this case, the scope of the decisions that have to be made by the navigation manager may be much more limited; the navigation manager may, for example, select a high level route but otherwise follow the precise directive provided by the individual 1010, as indicated in block 1060. Of course, in various embodiments, a given navigation manager may be capable of different levels of autonomy, and as a result the scope of the decisions that have to be made by the navigation manager may be determined by the authorized individual. That is, the navigation manager may adapt itself to the degree of specificity and precision selected by the individual.

Figure 11:
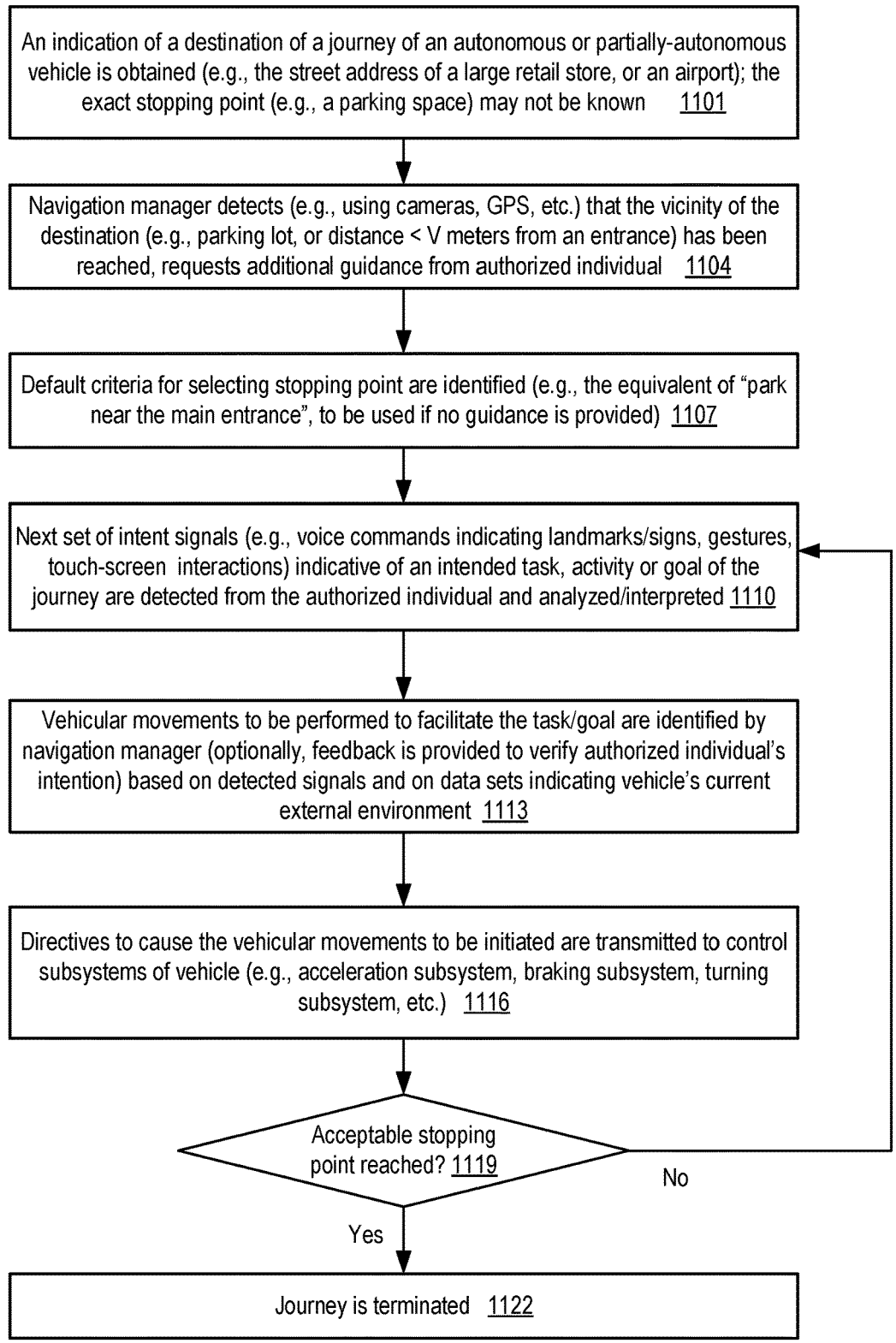
FIG. 11 is a flow diagram illustrating aspects of operations which may be performed at a system which enables guidance of vehicle navigation via intent signals, according to at least some embodiments.

FIG. 11 is a flow diagram illustrating aspects of operations which may be performed at a system which enables guidance of vehicle navigation via intent signals. As shown in element 1101, an indication of a destination of a journey to be completed using an autonomous or partly autonomous vehicle may be obtained at a navigation manager associated with the vehicle. The information about the destination, such as a street address of a large retail store or an airport may be sufficient, for example, to identify a high-level route to be used to get to the vicinity of the destination, but an exact stopping point (such as a particular parking space) may not have been identified when the destination is indicated. Any of a number of different interfaces or sensor devices may be used to obtain the indication of the destination, such as microphone used for verbal commands, a map-based interface, a text-based interface, or the like.

The navigation manager of the vehicle may detect when the vicinity of the destination is reached (element 1104), e.g., when a parking lot associated with the destination is entered from a street, or when the distance to at least one entrance of a destination building is less than V meters. Any of a number of different data sources or sensors may be used to detect that the destination vicinity has been reached, including for example GPS devices, cameras, and the like. The navigation manager may generate a request, e.g., a voiced request or a request shown on a screen such as a heads-up screen, to request guidance from one or more authorized individuals in the vehicle regarding an intended stopping point for the vehicle or a path that the vehicle should take in the vicinity of the destination in some embodiments.

The navigation manager may select default criteria for selecting a stopping point (e.g., an attempt to find a parking space close to the main entrance of the destination may be made) in case no additional guidance is provided by the individual(s) in the depicted embodiment (element 1107). In general, in various situations the navigation manager may generate at least one backup plan (determined, for example, to achieve a minimum level of safety while also directed towards a stopping point associated with the destination) whenever guidance from an individual via intent signals is anticipated, so that a lack of input (or delayed input) from the individual does not lead to undesired consequences.

The next set of intent signals may be detected from the individual (element 1110). The signals, which may be obtained via one or more sensors of the vehicle, such as cameras, microphones, touch-screen sensors on portable devices or wired devices, and so on, may for example indicate an intended task or activity, identify a landmark or sign which can be viewed from the vehicle, or specify a direction in which the vehicle should be moved next. A variety of features of buildings or other objects may be indicated via the intent signals, including exits/entrances, construction elements such as windows, walkways, loading docks, ramps, and the like, some of which may be indicated via natural language descriptions such as "where the sidewalk starts". Depending on the combination of sensors used, the signals may be analyzed using any of a variety of algorithms, including for example natural language processing algorithms, object recognition algorithms and the like. Signals of several different modes may be detected and interpreted in some embodiments—e.g., a combination of a gesture and a voice command may be analyzed in an attempt to determine an intent of the individual. In various embodiments, at least a subset of the signals may be obtained via sensor devices or interfaces that are mechanically decoupled from steering or other control subsystems of the vehicle—so, for example, if the vehicle comprises a steering wheel or an analogous steering component, such signals may be detected using sensor devices which are not physically attached to or part of the steering wheel or steering component.

One or more vehicular movements to be performed to facilitate the intended task/goal may be identified by navigation manager (element 1113), e.g., based on the detected signals and on data sets indicating the vehicle's current external environment (collected from external cameras and/or other sensors). Optionally, feedback may be provided to the authorized individual to verify an authorized individual's intention, e.g., using a vocalized message or a display.

One or more motion directives to cause initiation of the vehicular movements may be transmitted to motion control subsystems of the vehicle (element 1116), such as the acceleration subsystem, the braking or turning subsystem, and so on. If an acceptable stopping point of the journey has been reached (as detected in operations corresponding to element 1119), such as a parking spot near an entrance which facilitates the task the individual (or other occupants of the vehicle) intended, the journey may be terminated (element 1122) or at least paused, enabling occupants to exit and perform the intended task. The determination as to whether the stopping point is acceptable may be made by the navigation manager in combination with the authorized individual in some embodiments, and may involve one or more additional interactions between the individual and the navigation manager (e.g., the navigation manager may announce that the destination has been reached, and wait for further guidance). If the stopping point is not acceptable (as also detected in operations corresponding to element 1119), one or more additional iterations of intent signal detection, interpretation and motion directive generation may be performed (repeating operations corresponding to elements 1110 onwards) until an acceptable stopping point is eventually reached in the depicted embodiment.

Figure 12:
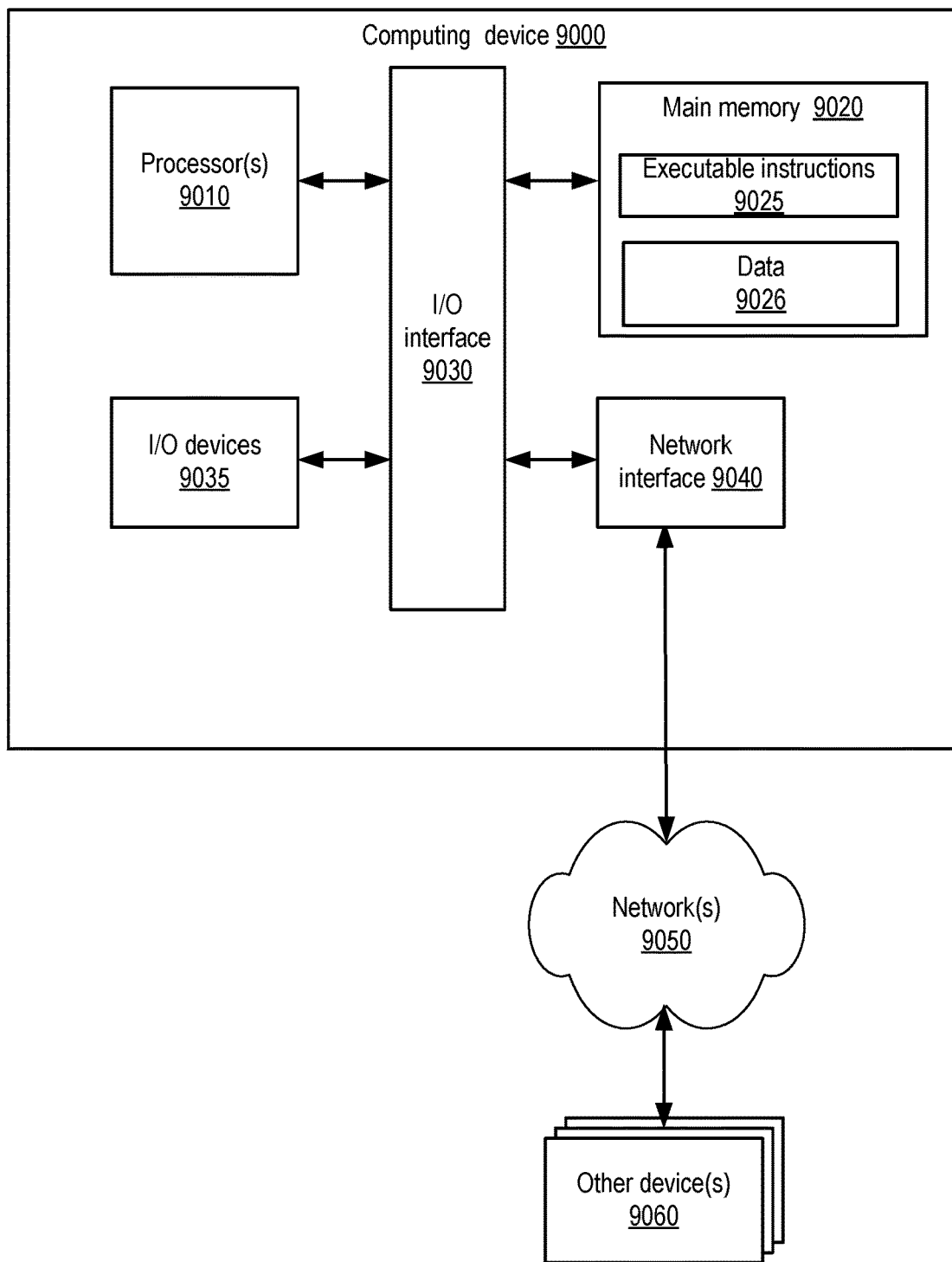
FIG. 12 is a block diagram illustrating an example computing device that may be used in at least some embodiments.

In at least some embodiments, a server that implements a portion or all of one or more of the technologies described herein, including the techniques to collect, obtain or process signals of various types (including gesture, gaze, voice, or touch-based intent signals emanating from individuals as well as signals indicative of the individuals' external environment) and perform corresponding actions (such as changing contents of various displays and initiating operations based on selected options), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (Re-RAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 1926 implementing one or more desired functions, such as those methods, techniques, and data described above, are shown stored within main memory 9020.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices for gaze signal collection, gesture signal collection, touch signal collection, external environmental signal collection, voice collection, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, at one or more computing devices:
obtaining a first indication of a destination of a vehicle;

receiving user input for an intended path for navigating the vehicle within a vicinity of the destination, wherein the intended path is usable to determine a navigation path within the vicinity of the destination;

identifying, based at least in part on (a) the intended path and (b) a data set including information indicating an external environment of the vehicle, one or more vehicular movements to be implemented to proceed along the navigation path; and transmitting a first directive to one or more motion control subsystems of the vehicle to initiate at least a first vehicular movement of the one or more vehicular movements.

2. The method as recited in claim 1, wherein the vicinity comprises a plurality of vehicle stopping points, and wherein the one or more signals are usable to determine the navigation path towards a particular vehicle stopping point of the plurality of vehicle stopping points.

3. The method as recited in claim 2, wherein the vicinity comprises a parking area, wherein individual ones of the plurality of vehicle stopping points comprise respective parking spaces within the parking area, and wherein the particular vehicle stopping point comprises a particular parking space within the parking area.

4. The method as recited in claim 3, wherein the parking area is associated with a building having a plurality of entrances, and wherein the particular parking space is near a particular entrance of the plurality of entrances.

5. The method as recited in claim 3, wherein the particular parking space is near an exit of the parking area.

6. The method as recited in claim 1, wherein said receiving the user input comprises detecting one or more displacements of an icon on a graphical user interface.

7. The method as recited in claim 6, wherein the graphical user interface defines a grid representing a plurality of discrete path segments which can be traversed within the vicinity, and wherein the one or more displacements include a first displacement corresponding to a particular discrete path segment of the plurality of path segments.

8. The method as recited in claim 1, further comprising performing, by the one or more computing devices:
populating one or more elements of a multi-option menu with respective options, wherein a particular option of the respective options indicates an intended task; and
determining that the particular option has been selected from the multi-option menu.

9. The method as recited in claim 1, further comprising performing, by the one or more computing devices:
detecting, using the one or more sensors, one or more additional signals indicative of a command to adjust a position of the vehicle, wherein the command is issued by an individual while the individual is outside the vehicle; and
transmitting another directive to the one or more motion control subsystems of the vehicle to initiate a different vehicular movement in response to the command.

10. The method as recited in claim 9, wherein the command is issued by the individual using a portable computing device.

11. A system, comprising:
a navigation manager implemented at least in part at a computing device;
wherein the navigation manager is configured to:
receive user input for an intended path for navigating a vehicle within a vicinity of a destination, wherein the intended path is usable to determine a navigation path within the vicinity of the destination;
identify, based at least in part on (a) the intended path and (b) a data set including information indicating an external environment of the vehicle, one or more vehicular movements to be implemented to proceed along the navigation path; and
transmit a first directive to one or more motion control subsystems of the vehicle to initiate at least a first vehicular movement of the one or more vehicular movements.

12. The system as recited in claim 11, wherein the vicinity comprises a plurality of vehicle stopping points, and wherein the one or more signals are usable to determine the navigation path towards a particular vehicle stopping point of the plurality of vehicle stopping points.

13. The system as recited in claim 12, wherein the vicinity comprises a parking area, wherein individual ones of the plurality of vehicle stopping points comprise respective parking spaces within the parking area, and wherein the particular vehicle stopping point comprises a particular parking space within the parking area.

14. The system as recited in claim 11, wherein the navigation manager is configured to:
detect, using one or more sensor devices, one or more additional signals indicative of a command to adjust a position of the vehicle, wherein the command is issued by an individual while the individual is outside the vehicle; and
transmit another directive to the one or more motion control subsystems of the vehicle to initiate a different vehicular movement in response to the command.

15. The method as recited in claim 14, wherein the command is issued by the individual using a portable computing device.

16. A non-transitory computer-accessible storage medium storing program instructions that when executed on one or more processors:
receive user input for an intended path for navigating a vehicle within a vicinity of a destination, wherein the intended path is usable to determine a navigation path within the vicinity of the destination;
identify, based at least in part on (a) the intended path and (b) a data set including information indicating an external environment of the vehicle, one or more vehicular movements to be implemented to proceed along the navigation path; and
transmit a first directive to one or more motion control subsystems of the vehicle to initiate at least a first vehicular movement of the one or more vehicular movements.

17. The non-transitory computer-accessible storage medium storing program instructions as recited in claim 16, wherein the vicinity comprises a plurality of vehicle stopping points, and wherein the one or more signals are usable to determine the navigation path towards a particular vehicle stopping point of the plurality of vehicle stopping points.

18. The non-transitory computer-accessible storage medium storing program instructions as recited in claim 17, wherein the vicinity comprises a parking area, wherein individual ones of the plurality of vehicle stopping points comprise respective parking spaces within the parking area, and wherein the particular vehicle stopping point comprises a particular parking space within the parking area.

19. The non-transitory computer-accessible storage medium storing program instructions as recited in claim 16, wherein the instructions when executed on the one or more processors:

detect, using one or more sensor devices, one or more additional signals indicative of a command to adjust a position of the vehicle, wherein the command is issued by an individual while the individual is outside the vehicle; and transmit another directive to the one or more motion control subsystems of the vehicle to initiate a different vehicular movement in response to the command.

20. The non-transitory computer-accessible storage medium storing program instructions as recited in claim 19, wherein the command is issued by the individual using a portable computing device.

* * * * *